United States Patent
Catreux-Erceg

(10) Patent No.: US 8,014,438 B2
(45) Date of Patent: Sep. 6, 2011

(54) METHOD AND APPARATUS TO COMPUTE A NOISE POWER ESTIMATE IN A WCDMA NETWORK BASED ON DEDICATED PHYSICAL CONTROL CHANNEL (DPCCH) PROCESSING

(75) Inventor: Severine E. Catreux-Erceg, Cardiff, CA (US)

(73) Assignee: Broadcom Corporation, Irvine, CA (US)

( * ) Notice: Subject to any disclaimer, the term of this patent is extended or adjusted under 35 U.S.C. 154(b) by 885 days.

(21) Appl. No.: 11/935,841

(22) Filed: Nov. 6, 2007

(65) Prior Publication Data
US 2009/0034598 A1 Feb. 5, 2009

Related U.S. Application Data

(60) Provisional application No. 60/953,309, filed on Aug. 1, 2007.

(51) Int. Cl.
*H04B 1/00* (2006.01)

(52) U.S. Cl. ........................................................ 375/147
(58) Field of Classification Search ........... 375/147–153
See application file for complete search history.

(56) References Cited

U.S. PATENT DOCUMENTS 7,356,071 B2 * 4/2008 Li et al. ......................... 375/147

* cited by examiner

*Primary Examiner* — Sam K Ahn
(74) *Attorney, Agent, or Firm* — Garlick Harrison & Markison; Bruce E. Garlick

(57) ABSTRACT

A method to process DP bits within a WCDMA receiver where a noise estimation that may be implemented within hardware is provided for improved flexibility and performance. DPCH pilot symbols are received, quantized, channel compensated and combined. The computation of an SNR estimate based on the combined DPCH pilot symbols is provided. Noise estimation is used as part of the SNR estimation of the DP bits (used for downlink power control). This method does not rely on the assumption that the channel is constant over the DP field, while prior methods did.

16 Claims, 17 Drawing Sheets

METHOD AND APPARATUS TO COMPUTE A NOISE POWER ESTIMATE IN A WCDMA NETWORK BASED ON DEDICATED PHYSICAL CONTROL CHANNEL (DPCCH) PROCESSING

CROSS-REFERENCE TO RELATED APPLICATIONS/INCORPORATION BY REFERENCE

The present U.S. Utility Patent Application claims priority pursuant to 35 U.S.C. §119(e) to the following U.S. Provisional Patent Applications which are hereby incorporated herein by reference in their entirety and made part of the present U.S. Utility Patent Application for all purposes:

1. U.S. Provisional Patent Application Ser. No. 60/953,309 entitled "DEDICATED PHYSICAL CONTROL CHANNEL (DPCCH) PROCESSING IN A RAKE FINGER." The above referenced application is hereby incorporated herein by reference in its entirety.

TECHNICAL FIELD OF THE INVENTION

The present invention relates generally to cellular wireless communication systems, and more particularly to a method and apparatus for processing downlink Dedicated Physical Control Channel (DPCCH) Pilots bits in a wideband CDMA (WCDMA) network.

BACKGROUND OF THE INVENTION

Cellular wireless communication systems support wireless communication services in many populated areas of the world. While cellular wireless communication systems were initially constructed to service voice communications, they are now called upon to support data and video (multimedia) communications as well. The demand for video and data communication services has exploded with the acceptance and widespread use video capable wireless terminals and the Internet. Video and data communications have historically been serviced via wired connections; cellular wireless users now demand that their wireless units also support video and data communications. The demand for wireless communication system video and data communications will only increase with time. Thus, cellular wireless communication systems are currently being created/modified to service these burgeoning demands.

Cellular wireless networks include a "network infrastructure" that wirelessly communicates with wireless terminals within a respective service coverage area. The network infrastructure typically includes a plurality of base stations dispersed throughout the service coverage area, each of which supports wireless communications within a respective cell (or set of sectors). The base stations couple to controllers, with each controller serving a plurality of Node B's. Each controller couples to a mobile switching center (MSC). Each controller also typically directly or indirectly couples to the Internet. In the $3^{rd}$ Generation Partnership Agreement (3GPP) these base stations may be referred to as "Node B's" and the wireless terminals may be referred to as user equipment (UE).

In operation, each Node B communicates with a plurality of wireless UEs operating in its cell/sectors. A controller coupled to the Node B routes voice, video, data or multimedia communications between the MSC and a serving base station. The MSC then routes these communications to another MSC or to the PSTN. Typically, controllers route data communications between a servicing Node B and a packet data network that may include or couple to the Internet. Transmissions from base stations to wireless terminals are referred to as "forward link" or "downlink" transmissions while transmissions from wireless terminals to base stations are referred to as "reverse link" or "uplink" transmissions. The volume of data transmitted on the forward link typically exceeds the volume of data transmitted on the reverse link. Such is the case because data users typically issue commands to request data from data sources, e.g., web servers, and the web servers provide the data to the wireless terminals. The great number of wireless terminals communicating with a single Node B forces the need to divide the forward and reverse link transmission resources (depending on the specific wireless standards, the resources could be frequency band, time slot, orthogonal code, and transmit power) amongst the various wireless terminals.

Wireless links between base stations and their serviced wireless terminals typically operate according to one (or more) of a plurality of operating standards. These operating standards define the manner in which the wireless link may be allocated, setup, serviced and torn down. One popular cellular standard is the Global System for Mobile telecommunications (GSM) standard. The GSM standard, or simply GSM, is predominant in Europe and is in use around the globe. The GSM standard has evolved in part into the $3^{rd}$ Generation Partnership Agreement (3GPP). 3GPP provides Technical Specifications and Technical Reports for a $3^{rd}$ Generation Mobile System based on evolved GSM core networks and the radio access technologies that they support (i.e., UMTS Terrestrial Radio Access (UTRA) both Frequency Division Duplex (FDD) and Time Division Duplex (TDD) modes). The scope also includes the maintenance and development of the Global System for Mobile communication (GSM) Technical Specifications and Technical Reports including evolved radio access technologies (e.g. General Packet Radio Service (GPRS) and Enhanced Data rates for GSM Evolution (EDGE)). While GSM originally serviced only voice communications, it has been modified to also service data communications. General Packet Radio Service (GPRS) operations and the Enhanced Data rates for GSM (or Global) Evolution (EDGE) operations coexist with GSM by sharing the channel bandwidth, slot structure, and slot timing of the GSM standard. GPRS operations and EDGE operations may also serve as migration paths for other standards as well, e.g., IS-136 and Pacific Digital Cellular (PDC).

Third generation (3G) cellular networks have been specifically designed to fulfill the future demands of the mobile Internet. As mobile Internet services grow in popularity and usage, factors such as cost efficient optimization of network capacity and quality of service (QoS) will become ever more essential to cellular operators. These factors may be achieved with careful network planning and operation, improvements in transmission methods, and advances in receiver techniques. To this end, carriers need technologies that will allow them to increase uplink and downlink throughput and, in turn, offer advanced QoS capabilities and speeds that rival those delivered by cable modem and/or DSL service providers. In this regard, networks based on wideband CDMA (WCDMA) technology can make the delivery of data to end users a more feasible option for today's wireless carriers. WCDMA has evolved continuously towards higher data rates and towards packet-switched IP-based services.

GPRS and EDGE technologies may be utilized for enhancing the data throughput of present second generation (2G) systems such as GSM. The GSM technology may support data rates of up to 14.4 kilobits per second (Kbps), while the GPRS technology may support data rates of up to 115 Kbps by allowing up to 8 data time slots per time division multiple access (TDMA) frame. The EDGE technology, a further enhancement to GPRS, may support data rates of up to 384 Kbps. The EDGE technology may utilizes 8 phase shift keying (8-PSK) modulation to provide higher data rates than those that may be achieved by GPRS technology. The GPRS and EDGE technologies may be referred to as "2.5G" technologies.

UMTS technology with theoretical data rates as high as 2 Mbps, is a 3G evolution of GSM, using wideband CDMA technology. UMTS may achieve higher data rates than GSM/EDGE due to many enhancements, including higher transmission bandwidth, adaptive higher order modulation and interference averaging due to a unity frequency reuse factor.

High-Speed Downlink Packet Access (HSDPA) technology is an Internet protocol (IP) based service, oriented towards data communications, which adapts WCDMA to support data transfer rates in the order of 14 megabits per second (Mbit/s). Developed by the 3G Partnership Project (3GPP) group, the HSDPA technology achieves higher data rates through a plurality of methods. In order to avoid excessive interference, 2G WCDMA may require fast power control to maintain a constant data rate. The HSDPA technology changes this paradigm and instead maintains a constant transmission power but may change the coding and modulation rate to adapt to changing channel conditions. Other methods that may be used to improve the data throughput are fast packet scheduling and a fast retransmission of lost packets by using Hybrid Automatic Repeat Request techniques.

Since processing of the data received to determine the need for retransmission takes place at the UE, these operations may be very sensitive to processing time. It is therefore important to devise methods that may lead to a minimum processing time for the determination of the need for a fast retransmission of lost packets without placing increasing demands on the processors and capacity of the UE. Unlike a desktop computer, the processors within the wireless terminal are assigned multiple processing duties. The addition of processing requirements within the wireless terminal requires new methods with which to balance data processing within the UE's while maintaining service.

BRIEF SUMMARY OF THE INVENTION

Embodiments of the present invention are directed to systems and methods that are further described in the following description and claims. Advantages and features of embodiments of the present invention may become apparent from the description, accompanying drawings and claims.

BRIEF DESCRIPTION OF THE DRAWINGS

For a more complete understanding of the present invention and the advantages thereof, reference is now made to the following description taken in conjunction with the accompanying drawings in which like reference numerals indicate like features and wherein.

DETAILED DESCRIPTION OF THE DRAWINGS

Preferred embodiments of the present invention are illustrated in the FIGs., like numerals being used to refer to like and corresponding parts of the various drawings.

Embodiments of the present invention provide a method to process Dedicated Pilot (DP) bits from multiple fingers within a WCDMA rake receiver. Dedicated Pilot Channel (DPCH) pilot symbols are received, quantized and channel compensated. Then processing operations for individual fingers for the channel compensated quantized despread DPCH pilot symbols are chosen based on the DPCH slot format associated with the despread DPCH pilot symbols and on the transmit diversity mode used at the transmitter. The DPCH pilot symbols are processed based on the DPCH slot format in order to produce processed DPCH pilot symbols in a common format. These processed symbols may then be combined.

Other embodiments may further allow for the computation of a signal to noise ratio (SNR) estimate based on the combined DPCH pilot symbols. The downlink DPCH can be seen as a time multiplex of a downlink DPDCH and a downlink DPCCH.

Figure 1:
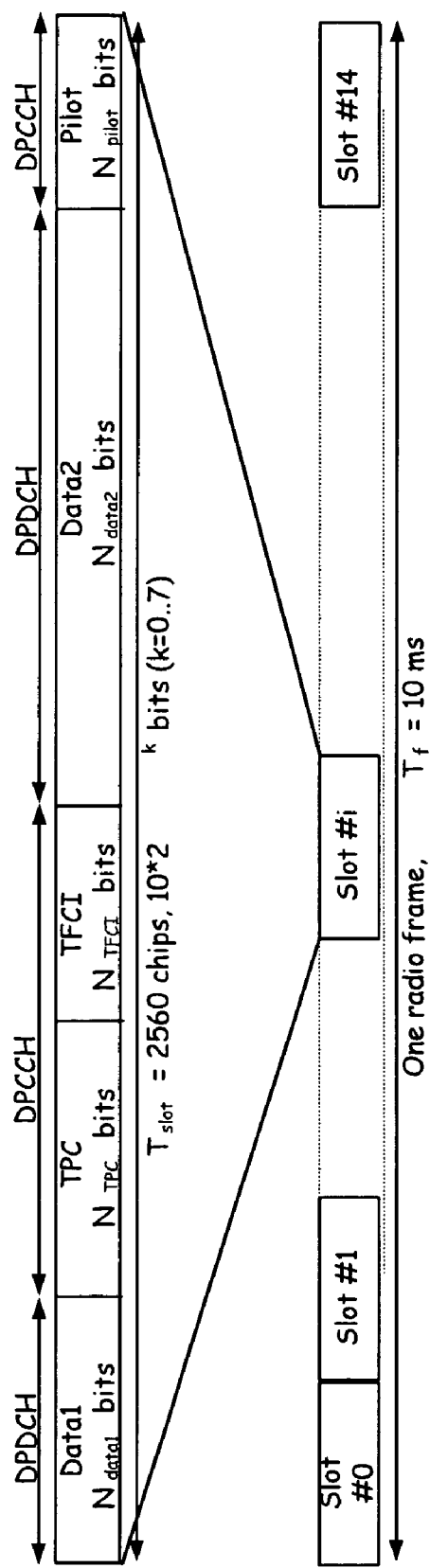
FIG. 1 illustrates a frame structure for a downlink DPCH in accordance with an embodiment of the present invention.

FIG. 1 shows the frame structure of the downlink DPCH. Each frame of length 10 ms is split into 15 slots, each of length $T_{slot}$=2560 chips. The parameter k in FIG. 1 determines the total number of bits per downlink DPCH slot. It is related to the spreading factor SF of the physical channel as $SF=512/2^k$. The spreading factor may thus range from 512 down to 4. The exact number of bits of the different downlink DPCH fields ($N_{pilot}$, $N_{TPC}$, $N_{TFCI}$, $N_{data1}$ and $N_{data2}$) is given in Table 1. What slot format to use is configured by higher layers and can also be reconfigured by higher layers.

Embodiments of the present invention provide that each finger of the rake receiver may be set to its own transmit diversity mode. The output of each finger is combined in the combiner regardless of the transmit diversity mode. Then only one common SNR estimation method is applied in the combiner regardless of each finger's transmit diversity mode.

Figure 2:
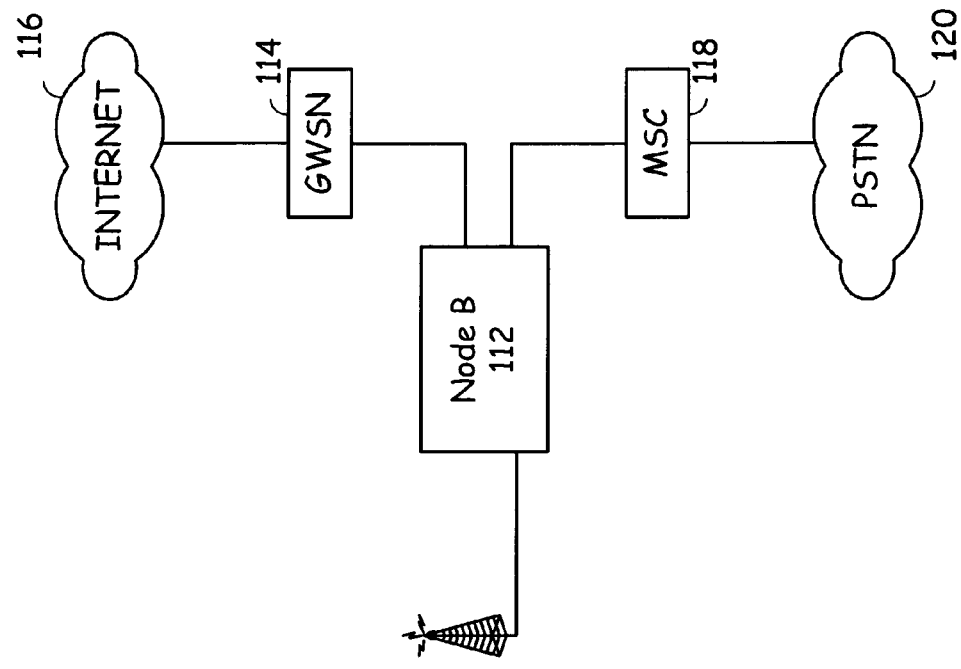
FIG. 2 is a system diagram illustrating a portion of a cellular wireless communication system that supports wireless terminals operating according to embodiments of the present invention.
Figure 2:
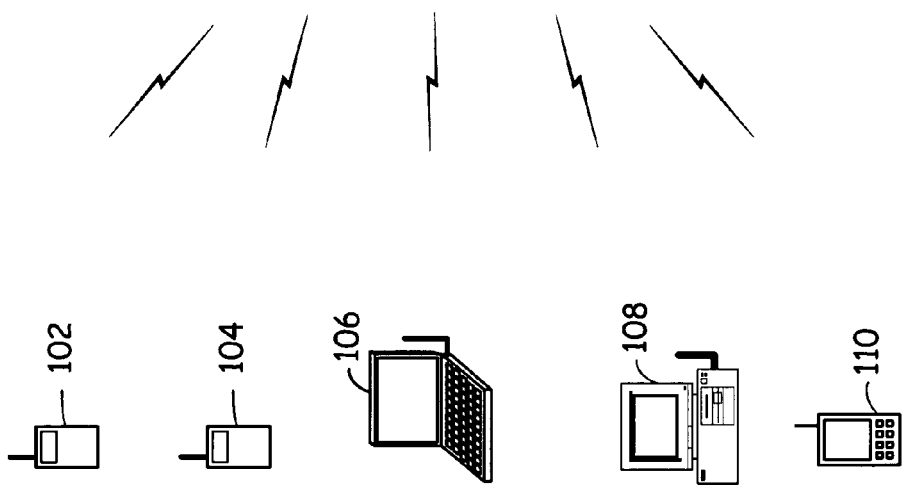

FIG. 2 is a system diagram illustrating a portion of a cellular wireless communication system 100 that supports wireless terminals operating according to the present invention. The cellular wireless communication system 100 includes a user equipment (ULEs) 102, 104, 106, 108 and 110, a 3GPP capable Node B 112, and a Node B of a Universal Mobile Telecommunications System (UMTS) third-generation (3G) mobile phone systems may couple to the Internet 116 via a GPRS Gateway Support Node (GWSN) 114. MSC 118 couples Node B 112 to the Public Switched Telephone Network (PSTN) 120.

TABLE 1

DPDCH and DPCCH fields in DPCH slot

| Slot Format #i | Channel Bit Rate (kbps) | Channel Symbol Rate (ksps) | SF | Bits/ Slot | DPDCH Bits/Slot | | DPCCH Bits/Slot | | | Transmitted slots per radio frame $N_{Tr}$ |
|---|---|---|---|---|---|---|---|---|---|---|
| | | | | | $N_{Data1}$ | $N_{Data2}$ | $N_{TPC}$ | $N_{TFCI}$ | $N_{Pilot}$ | |
| 0 | 15 | 7.5 | 512 | 10 | 0 | 4 | 2 | 0 | 4 | 15 |
| 0A | 15 | 7.5 | 512 | 10 | 0 | 4 | 2 | 0 | 4 | 8-14 |
| 0B | 30 | 15 | 256 | 20 | 0 | 8 | 4 | 0 | 8 | 8-14 |
| 1 | 15 | 7.5 | 512 | 10 | 0 | 2 | 2 | 2 | 4 | 15 |
| 1B | 30 | 15 | 256 | 20 | 0 | 4 | 4 | 4 | 8 | 8-14 |
| 2 | 30 | 15 | 256 | 20 | 2 | 14 | 2 | 0 | 2 | 15 |
| 2A | 30 | 15 | 256 | 20 | 2 | 14 | 2 | 0 | 2 | 8-14 |
| 2B | 60 | 30 | 128 | 40 | 4 | 28 | 4 | 0 | 4 | 8-14 |
| 3 | 30 | 15 | 256 | 20 | 2 | 12 | 2 | 2 | 2 | 15 |
| 3A | 30 | 15 | 256 | 20 | 2 | 10 | 2 | 4 | 2 | 8-14 |
| 3B | 60 | 30 | 128 | 40 | 4 | 24 | 4 | 4 | 4 | 8-14 |
| 4 | 30 | 15 | 256 | 20 | 2 | 12 | 2 | 0 | 4 | 15 |
| 4A | 30 | 15 | 256 | 20 | 2 | 12 | 2 | 0 | 4 | 8-14 |
| 4B | 60 | 30 | 128 | 40 | 4 | 24 | 4 | 0 | 8 | 8-14 |
| 5 | 30 | 15 | 256 | 20 | 2 | 10 | 2 | 2 | 4 | 15 |
| 5A | 30 | 15 | 256 | 20 | 2 | 8 | 2 | 4 | 4 | 8-14 |
| 5B | 60 | 30 | 128 | 40 | 4 | 20 | 4 | 4 | 8 | 8-14 |
| 6 | 30 | 15 | 256 | 20 | 2 | 8 | 2 | 0 | 8 | 15 |
| 6A | 30 | 15 | 256 | 20 | 2 | 8 | 2 | 0 | 8 | 8-14 |
| 6B | 60 | 30 | 128 | 40 | 4 | 16 | 4 | 0 | 16 | 8-14 |
| 7 | 30 | 15 | 256 | 20 | 2 | 6 | 2 | 2 | 8 | 15 |
| 7A | 30 | 15 | 256 | 20 | 2 | 4 | 2 | 4 | 8 | 8-14 |
| 7B | 60 | 30 | 128 | 40 | 4 | 12 | 4 | 4 | 16 | 8-14 |
| 8 | 60 | 30 | 128 | 40 | 6 | 28 | 2 | 0 | 4 | 15 |
| 8A | 60 | 30 | 128 | 40 | 6 | 28 | 2 | 0 | 4 | 8-14 |
| 8B | 120 | 60 | 64 | 80 | 12 | 56 | 4 | 0 | 8 | 8-14 |
| 9 | 60 | 30 | 128 | 40 | 6 | 26 | 2 | 2 | 4 | 15 |
| 9A | 60 | 30 | 128 | 40 | 6 | 24 | 2 | 4 | 4 | 8-14 |
| 9B | 120 | 60 | 64 | 80 | 12 | 52 | 4 | 4 | 8 | 8-14 |
| 10 | 60 | 30 | 128 | 40 | 6 | 24 | 2 | 0 | 8 | 15 |
| 10A | 60 | 30 | 128 | 40 | 6 | 24 | 2 | 0 | 8 | 8-14 |
| 10B | 120 | 60 | 64 | 80 | 12 | 48 | 4 | 0 | 16 | 8-14 |
| 11 | 60 | 30 | 128 | 40 | 6 | 22 | 2 | 2 | 8 | 15 |
| 11A | 60 | 30 | 128 | 40 | 6 | 20 | 2 | 4 | 8 | 8-14 |
| 11B | 120 | 60 | 64 | 80 | 12 | 44 | 4 | 4 | 16 | 8-14 |
| 12 | 120 | 60 | 64 | 80 | 12 | 48 | 4 | 8* | 8 | 15 |
| 12A | 120 | 60 | 64 | 80 | 12 | 40 | 4 | 16* | 8 | 8-14 |
| 12B | 240 | 120 | 32 | 160 | 24 | 96 | 8 | 16* | 16 | 8-14 |
| 13 | 240 | 120 | 32 | 160 | 28 | 112 | 4 | 8* | 8 | 15 |
| 13A | 240 | 120 | 32 | 160 | 28 | 104 | 4 | 16* | 8 | 8-14 |
| 13B | 480 | 240 | 16 | 320 | 56 | 224 | 8 | 16* | 16 | 8-14 |
| 14 | 480 | 240 | 16 | 320 | 56 | 232 | 8 | 8* | 16 | 15 |
| 14A | 480 | 240 | 16 | 320 | 56 | 224 | 8 | 16* | 16 | 8-14 |
| 14B | 960 | 480 | 8 | 640 | 112 | 464 | 16 | 16* | 32 | 8-14 |
| 15 | 960 | 480 | 8 | 640 | 120 | 488 | 8 | 8* | 16 | 15 |
| 15A | 960 | 480 | 8 | 640 | 120 | 480 | 8 | 16* | 16 | 8-14 |
| 15B | 1920 | 960 | 4 | 1280 | 240 | 976 | 16 | 16* | 32 | 8-14 |
| 16 | 1920 | 960 | 4 | 1280 | 248 | 1000 | 8 | 8* | 16 | 15 |
| 16A | 1920 | 960 | 4 | 1280 | 248 | 992 | 8 | 16* | 16 | 8-14 |

Each Node B services a cell/set of sectors within which it supports wireless communications. Wireless links that include both forward link components and reverse link components support wireless communications between the base stations and their serviced wireless terminals. These wireless links support digital voice, video, multimedia, and data communications. The cellular wireless communication system 100 may also be backward compatible in supporting analog operations as well. The cellular wireless communication system 100 supports the GSM standard which has evolved into the $3^{rd}$ Generation Partnership Agreement (3GPP). 3GPP provides Technical Specifications and Technical Reports for a $3^{rd}$ Generation Mobile System based on evolved GSM core networks and the radio access technologies that they support (i.e., Universal Terrestrial Radio Access (UTRA) both Frequency Division Duplex (FDD) and Time Division Duplex (TDD) modes). The scope also includes the maintenance and development of the Global System for Mobile communication (GSM) Technical Specifications and Technical Reports including evolved radio access technologies (e.g. General Packet Radio Service (GPRS) and Enhanced Data rates for GSM Evolution (EDGE)). The cellular wireless communication system 100 may also support the GSM General Packet Radio Service (GPRS) extension to GSM. However, the present invention is also applicable to other standards as well, e.g., TDMA standards, CDMA standards, etc.

Third generation (3G) cellular networks have been specifically designed to fulfill these future demands of the mobile Internet. In this regard, networks based on wideband CDMA (WCDMA) technology can make the delivery of data to end users a more feasible option for today's wireless carriers. WCDMA has evolved continuously towards higher data rates and towards packet-switched IP-based services.

UMTS technology with theoretical data rates as high as 2 Mbps, is a 3G evolution of GSM, using wideband CDMA technology. UMTS may achieve higher data rates than GSM/EDGE due to many enhancements, including higher transmission bandwidth, adaptive higher order modulation and interference averaging due to a unity frequency reuse factor.

High-Speed Downlink Packet Access (HSDPA) technology is an Internet protocol (IP) based service, oriented towards data communications, which adapts WCDMA to support data transfer rates in the order of 14 megabits per second (Mbit/s). Developed by the 3G Partnership Project (3GPP) group, the HSDPA technology achieves higher data rates through a plurality of methods. HSDPA technology maintains a constant transmission power but may change the coding and modulation rate to adapt to changing channel conditions. Other methods that may be used to improve the data throughput are fast packet scheduling and a fast retransmission of lost packets by using Hybrid Automatic Repeat Request techniques. The decision to request a retransmission is reduced in HSDPA where the TTI (transmission time interval) has been shortened to 2 ms in order to allow faster retransmitting of erroneous data blocks compared to the previous minimum TTI of 10 ms. This allows Node B to adapt literally every data block to fast changing radio conditions by the means of AMC. Thus it is possible to counteract the fading on the air-interface by adjusting modulation and coding almost every 2 ms depending on Node B's processing delay and packet scheduling algorithm.

UEs 102-110 support HSDPA and HSUPA communications. UEs 102-110 communicate with Node B via the MAC-hs for packet transmission and retransmission. Several new physical channels and a transport channel.

Figure 3:
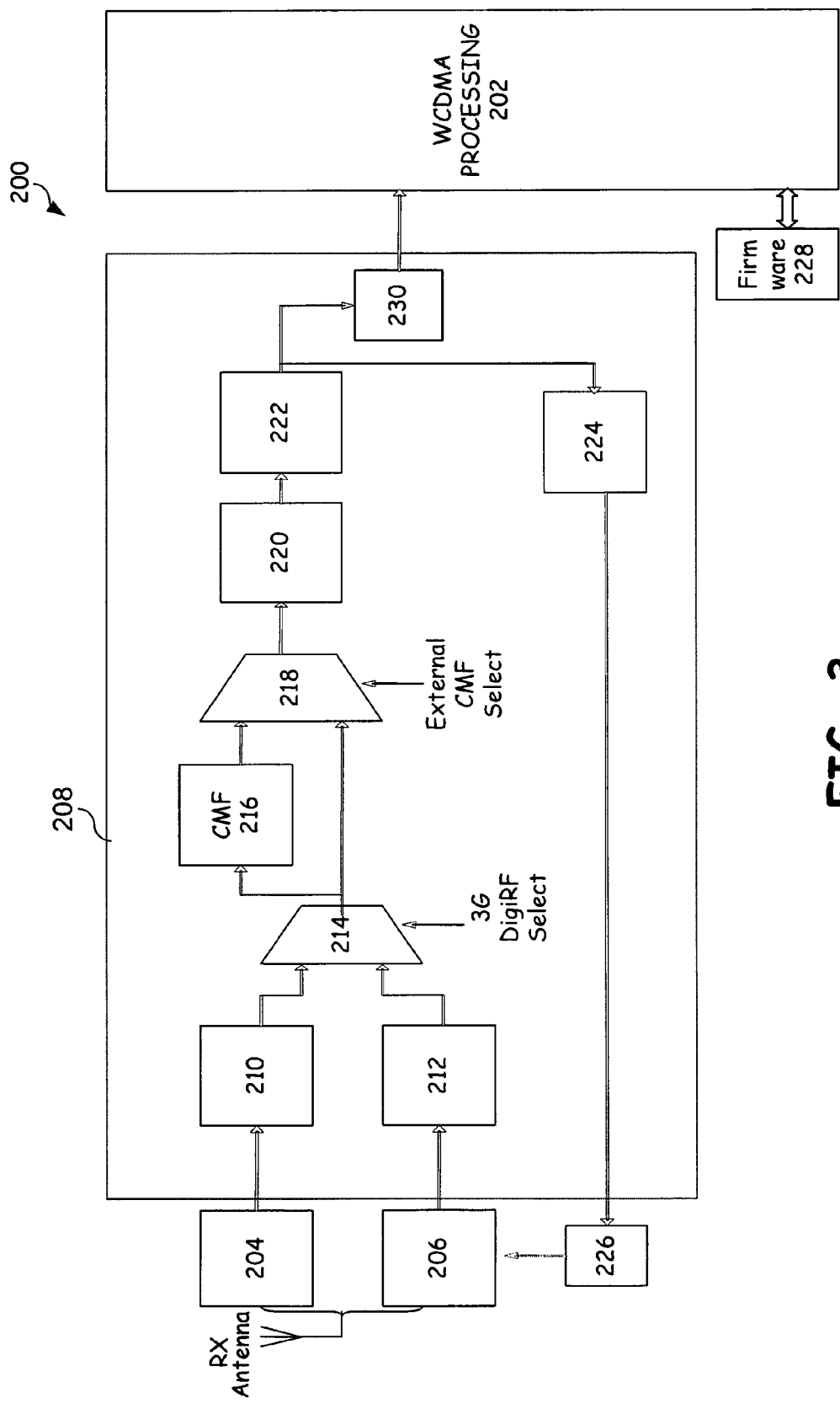
FIG. 3 is a block diagram functionally illustrating peripheral devices of a WCDMA processing block implemented as part of a WCDMA receiver constructed according to embodiments of the present invention.

FIG. 3 is a block diagram functionally illustrating the peripherals of a WCDMA processing block implemented as part of the WCDMA receiver 200. The top-level block diagram of the WCDMA receiver 200 shows the data path leading to the WCDMA processing block. The WCDMA block is configured by and later on interacts with the firmware block 228 to exchange data and control information. WCDMA receiver 200 uses either the $\Delta$-$\Sigma$ modulator 204 or the 3G DigiRF 206 to convert the RF signal to baseband. In one embodiment as shown, the output of the $\Delta$-$\Sigma$ modulator 204 is an N-level (i.e., N-level I and N-level Q, e.g., N=5) C×M (122.88 MHz, if M=32) sampled complex signal, while the 3G DigiRF output is a K-bit (i.e., K-bit I and K-bit Q, e.g. K=8) C×P (7.68 MHz, if P=2) sampled complex signal. These signals are the inputs to the baseband receiver block 208 of the WCDMA processor.

Inside one embodiment of baseband receiver block 208, the input from the $\Delta$-$\Sigma$ modulator 204 is down-sampled to C×4 (15.36 MHz) K-bit complex signal via a reconstruction/decimation FIR filter 210. Similarly, the C×P output from the 3G DigiRF block 206 is up-sampled via an interpolation FIR filter 212 to reach the same format of C×4, K-bit. Only one source is used ($\Delta$-$\Sigma$ modulator 204 or 3G DigiRF 206), based on a firmware configuration as implemented by Multiplexer 214. If 3G DigiRF output is used, then the chip-matched filter (CMF) 216 inside the baseband receiver block 208 can be bypassed if the chip-matched filter inside the 3G DigiRF block is used. The C×4 sampled signal is then up-sampled by a factor of 4 via an interpolation FIR filter 220 to reach C×16. A DC-offset detection and correction block 222 then removes the residue DC component from the signal. This signal is then down-sampled to the desired clock rate C×L (e.g., L=16, or 8 or 4) by decimator 230 and passed to the WCDMA processing block 202.

The C×16 sampled data, on a separate path, is down-sampled to C×4 in processing block 224 and then used to measure the received signal strength indicator (RSSI) of the received signal to assist the AGC function of the firmware in processing block 226 to adjust the variable gain amplifier inside the RF front-end 204 or the 3G DigiRF block 206.

Figure 4A:
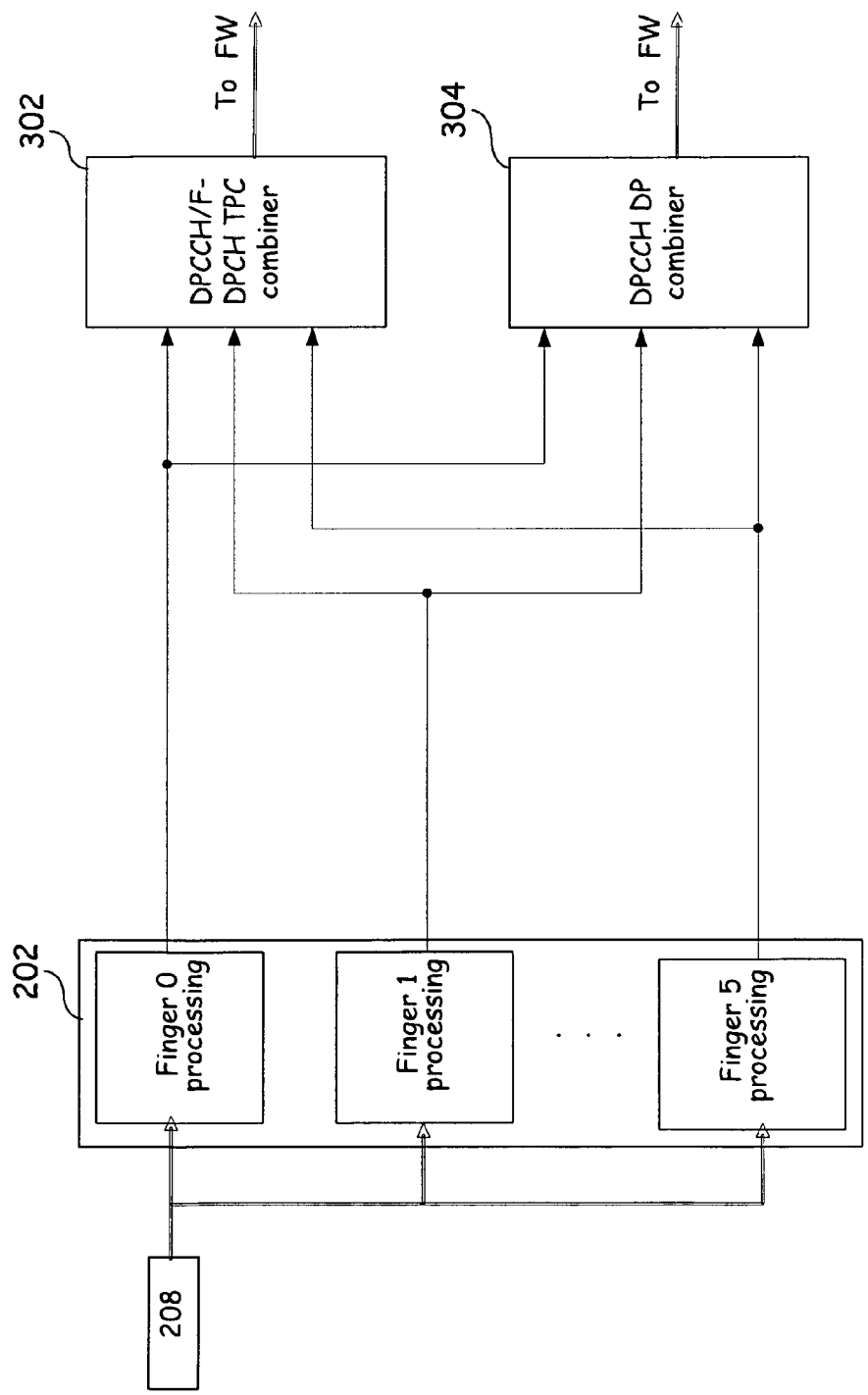
FIGS. 4A and 4B are top-level block diagrams illustrating the 'WCDMA Processing' block of FIG. 3 in accordance with embodiments of the present invention.
Figure 4B:
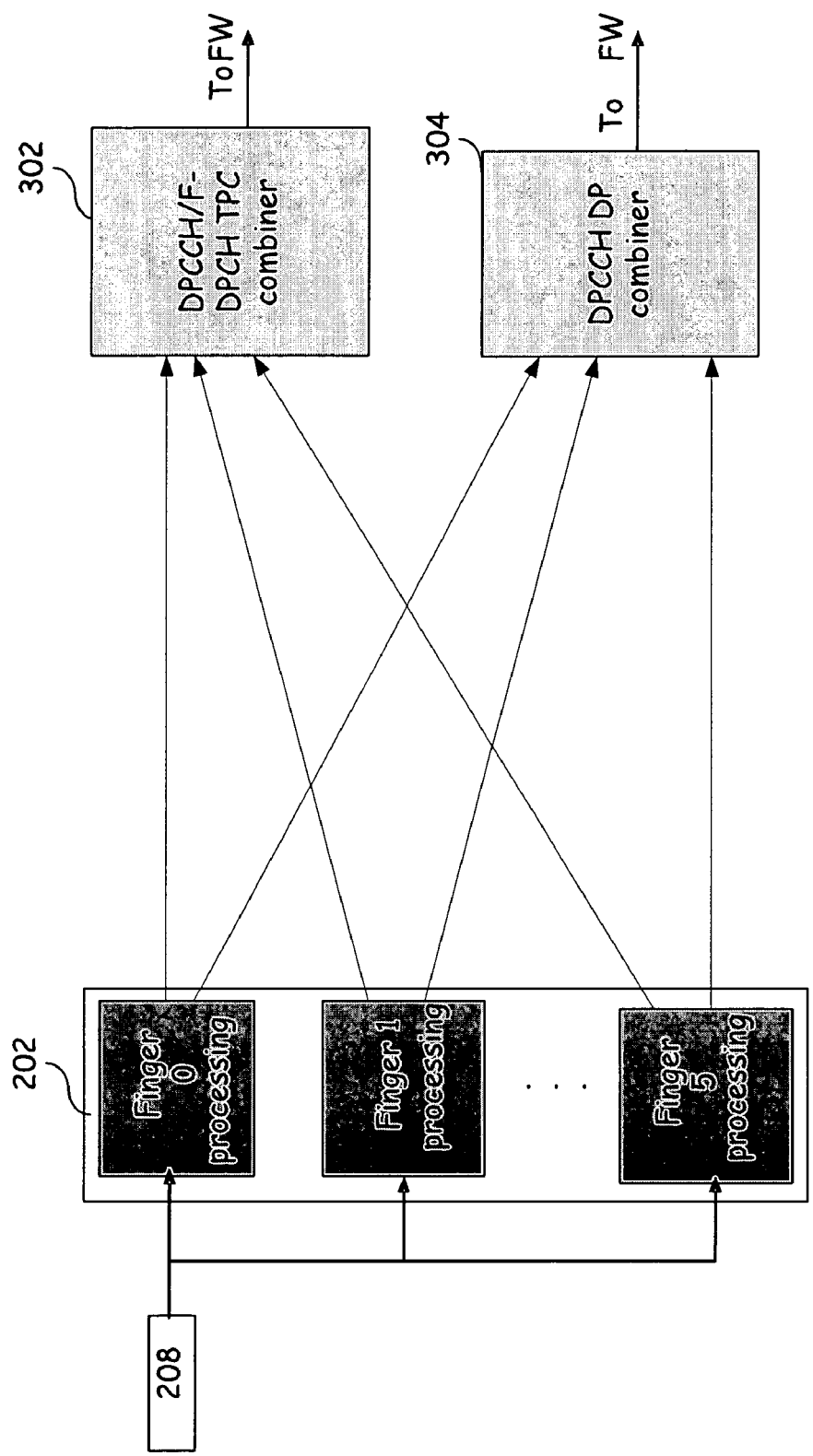

FIGS. 4A and 4B provide top-level block diagrams of the 'WCDMA Processing' block 202 of FIG. 3. in accordance with embodiments of the present invention. FIG. 4 shows the data/control path between major processing functions inside the WCDMA processing block 202. As indicated in FIG. 4A, each Finger x, (x=0, 1, 2, ... 5) processing block produces a single output which is then directed to two separate modules combiner 302 and combiner 304, labeled here by DPCCH/F-DPCH TPC combiner and DPCCH DP combiner. That is to say, the combiner handles the transmit power control (TPC) bits and DP bits (which are two types of control bits within the DPCCH channel) in two separate modules.

In the structure depicted in FIG. 4B, the processing of TPC bits and DP bits may be handled separately within each finger. Therefore, each finger has now 2 outputs, one for TPC and one for DP. The TPC output is wired to the DPCCH/F-DPCH TPC combiner module 302 and the DP output is wired to the DPCCH DP combiner module 304 for their respective processing.

Figure 5:
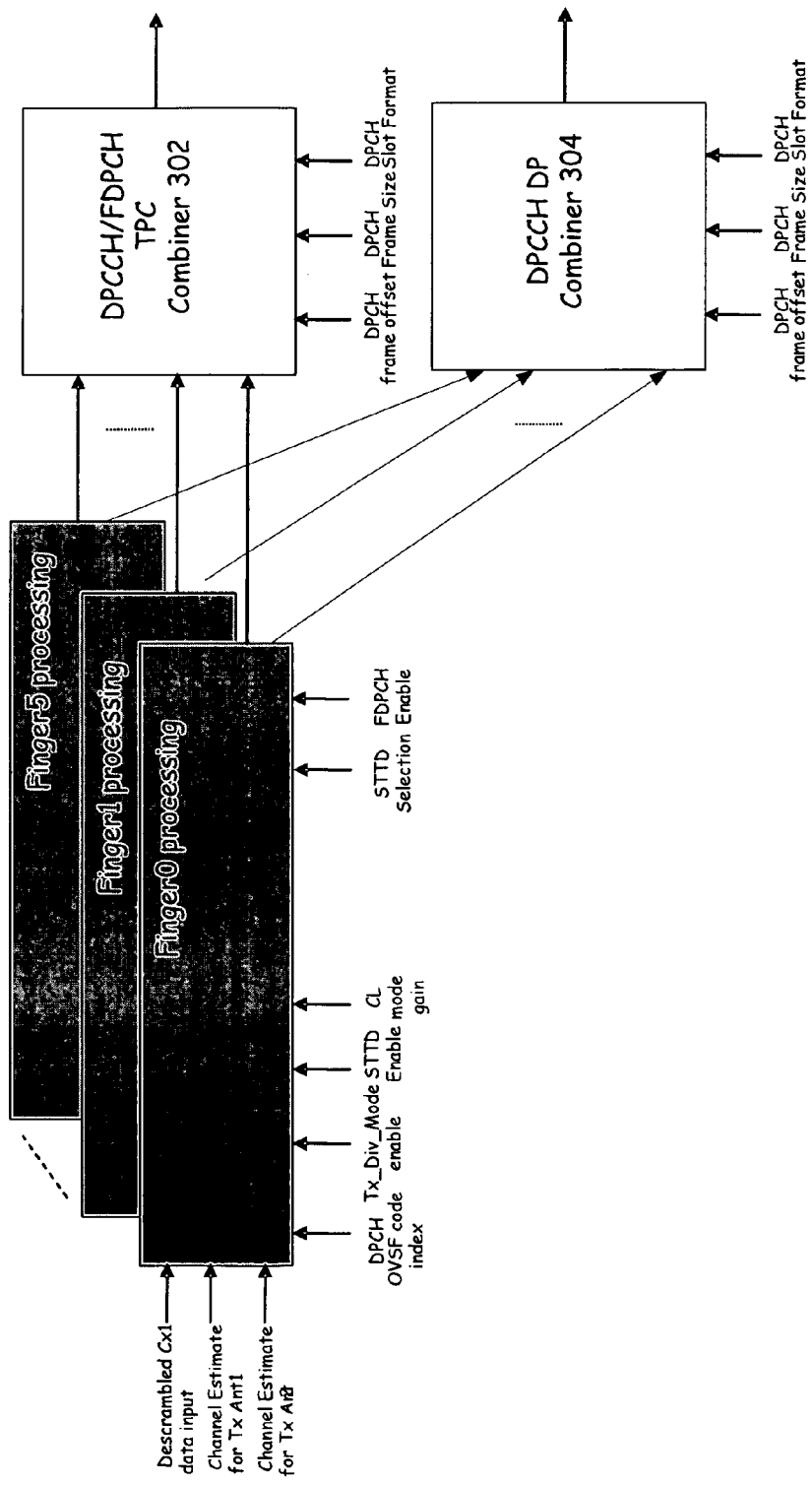
FIG. 5 is a low level block diagram illustrating the WCDMA DPCCH downlink processing block of FIG. 3 in accordance with embodiments of the present invention.

A lower level block diagram of the WCDMA DPCCH downlink processing block in FIGS. 4A and 4B is depicted in FIG. 5, where the interface signals of the DPCCH processing block 202 to the peripheral hardware blocks and the firmware block is shown. FIG. 5 also shows the interconnections among processing blocks within the DPCCH processing module 202. Table 1 describe the interface signals of the DPCCH processing block, while the following discussion details the operations of the processing blocks within DPCCH processing.

The interface specifications between the DPCCH processing block and other hardware and firmware blocks in accordance with one embodiment are given in Table 2 below.

| Signal name | I/O | Rate | Description |
|---|---|---|---|
| Other HW blocks | | | |
| Descrambled Cx1 input data | Input from descrambler block | Cx1 | Descrambled data, per finger. |
| Channel Estimate for Tx Ant1 | Input from channel estimation block | 256-chip | Channel estimate that is read every 256 chips, per-finger |
| Channel Estimate for Tx Ant2 | Input from channel estimation block | 256-chip | Channel estimate that is read every 256 chips, per-finger, diversity antenna if TxD is on. |
| FW | | | |
| DPCH OVSF code index | Input | At configuration or reconfiguration | index for the OVSF code |
| Tx Diversity Mode Enable | Input | At configuration or reconfiguration | This is the indicator of open or closed loop diversity. |
| STTD Enable | Input | At configuration or reconfiguration | This is the indicator of Normal mode or diversity mode. |
| CL mode gain | Input | slot | This is the closed-loop mode gain (weight0 and weight1). |
| STTD selection | Input | At configuration or reconfiguration | Indicates what STTD decoding block should be used. The value depends on the slot format |
| FDPCH enable | Input | At configuration or reconfiguration | This is the indicator of Fractional DPCH |

Figure 6:
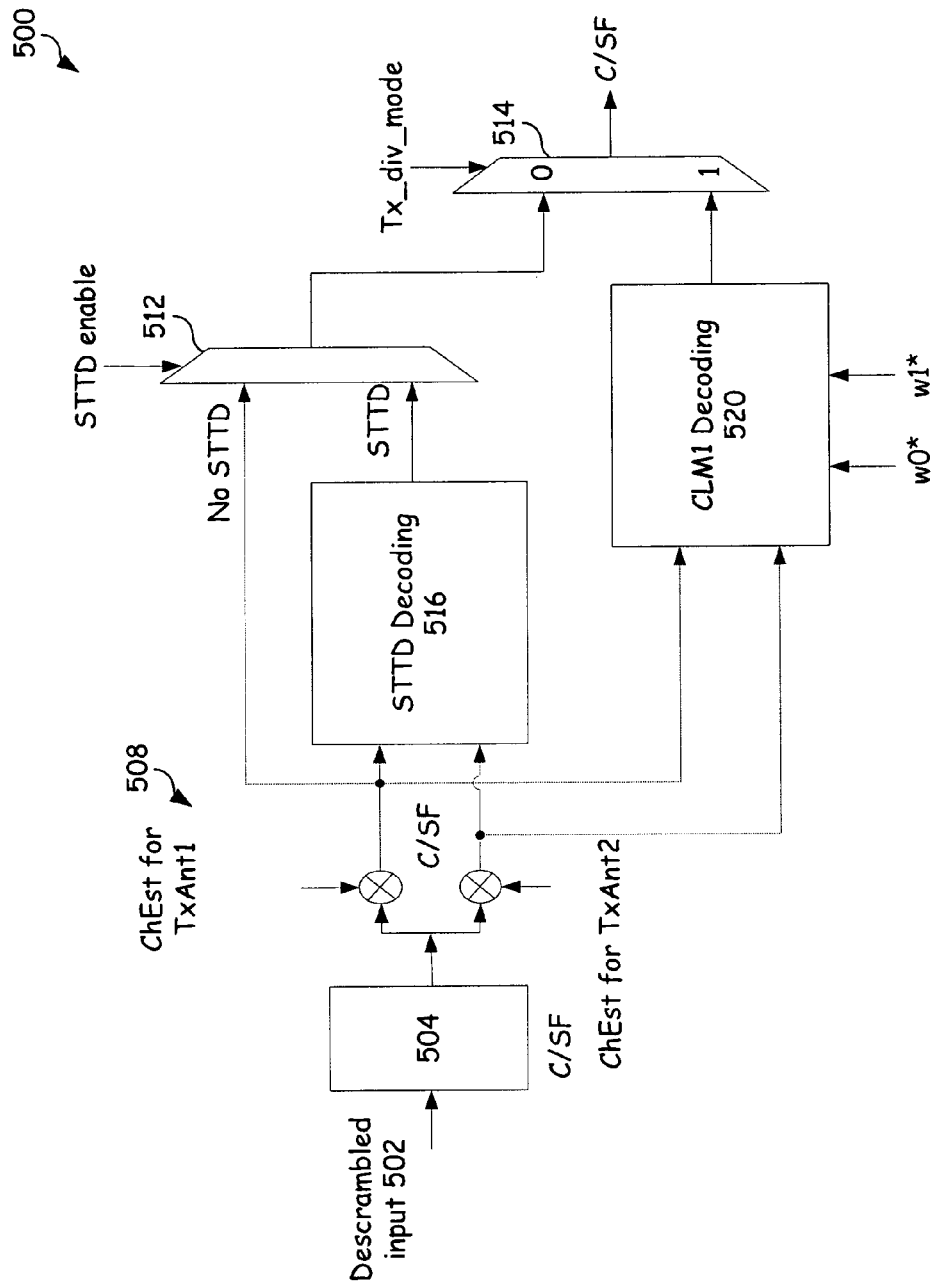
FIG. 6 is a block diagram illustrating finger Dedicated Physical Channel (DPCH) processing in accordance with one or more embodiments of the present invention.

FIG. 6 provides a block diagram of a finger DPCH processing block in accordance with an embodiment of the present invention, following the structure shown in FIG. 4A, i.e., the finger processing block produces only a single output. Starting from the input of the DPCH processing from the left-most side, the finger processing block 500 takes the chip-level descrambled input 502 from the sampling circuit and despreads the data based on the orthogonal variable spreading factor (OVSF) code in block 504. To complete this function block 504 needs the OVSF index and the OVSF code phase, which is aligned with the slot boundary. The OVSF index can be used to look-up the actual OVSF code. The output of the DPCH despreading block 504 is SF-chip rate or "C/SF." The despread DPCH pilot symbol is quantized and passed through the channel compensation block 508. The channel estimates are read in at the same SF-chip rate. The output of the channel compensation block 508 is directed to 3 paths:

a) normal mode path: STTD enable=0 and Tx_div_mode=0, the signal is passed directly to the combiner by multiplexers 512 and 514.

b) STTD mode: STTD enable=1 and Tx_div_mode=0, the signal is passed through the STTD decoding block 516 and then to the combiner by multiplexers 512 and 514.

c) CL mode: STTD enable=0 or 1 and Tx_div_mode=1, the signal is multiplied by the CL gains w0* and w1* in the CLM1 decoding block 520 and then summed, and finally passed to the combiner by multiplexer 514.

Figure 7A:
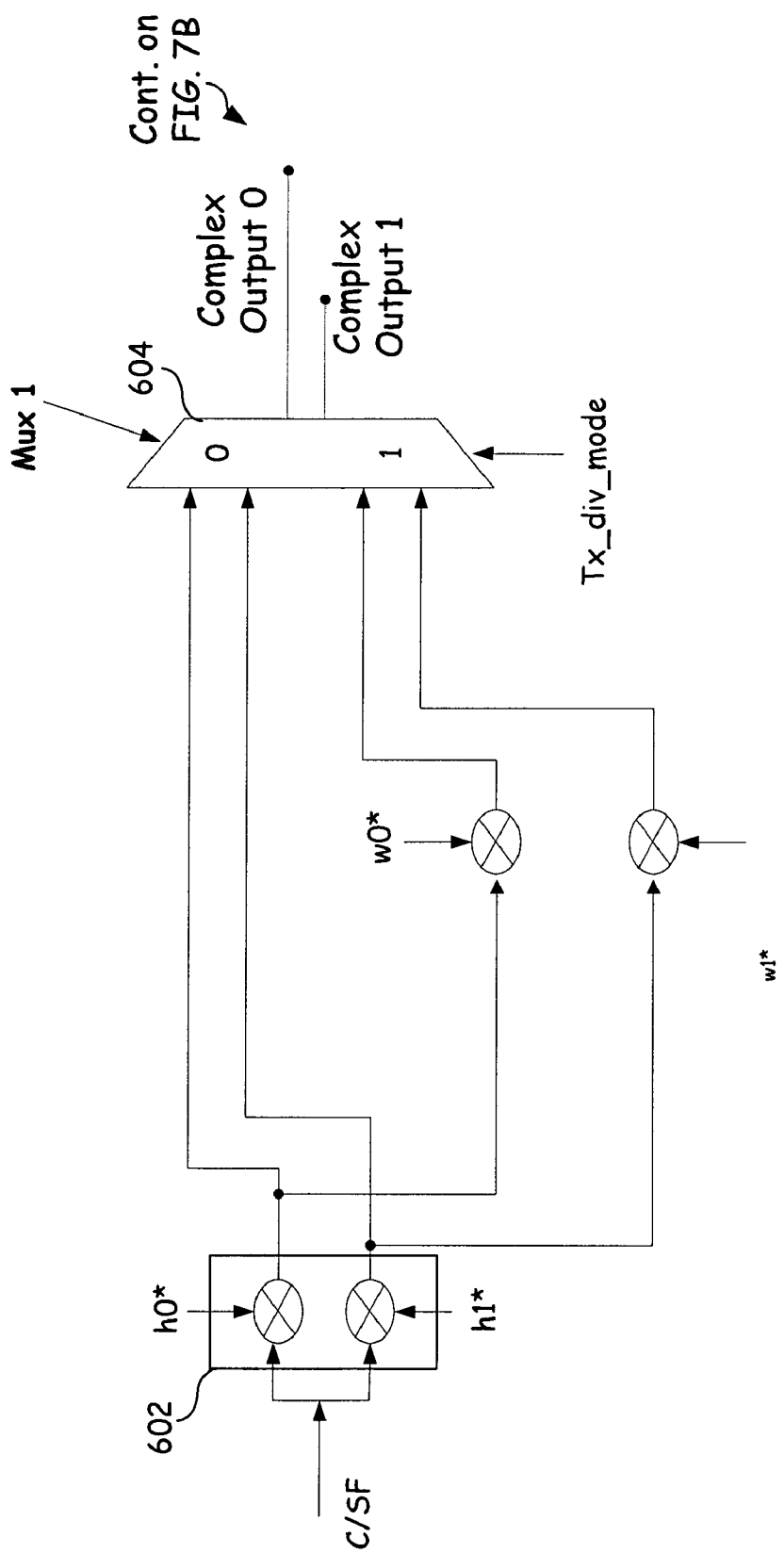
FIGS. 7A and 7B is a block diagram illustrating finger DPCH processing in accordance with one or more embodiments of the present invention.
Figure 7B:
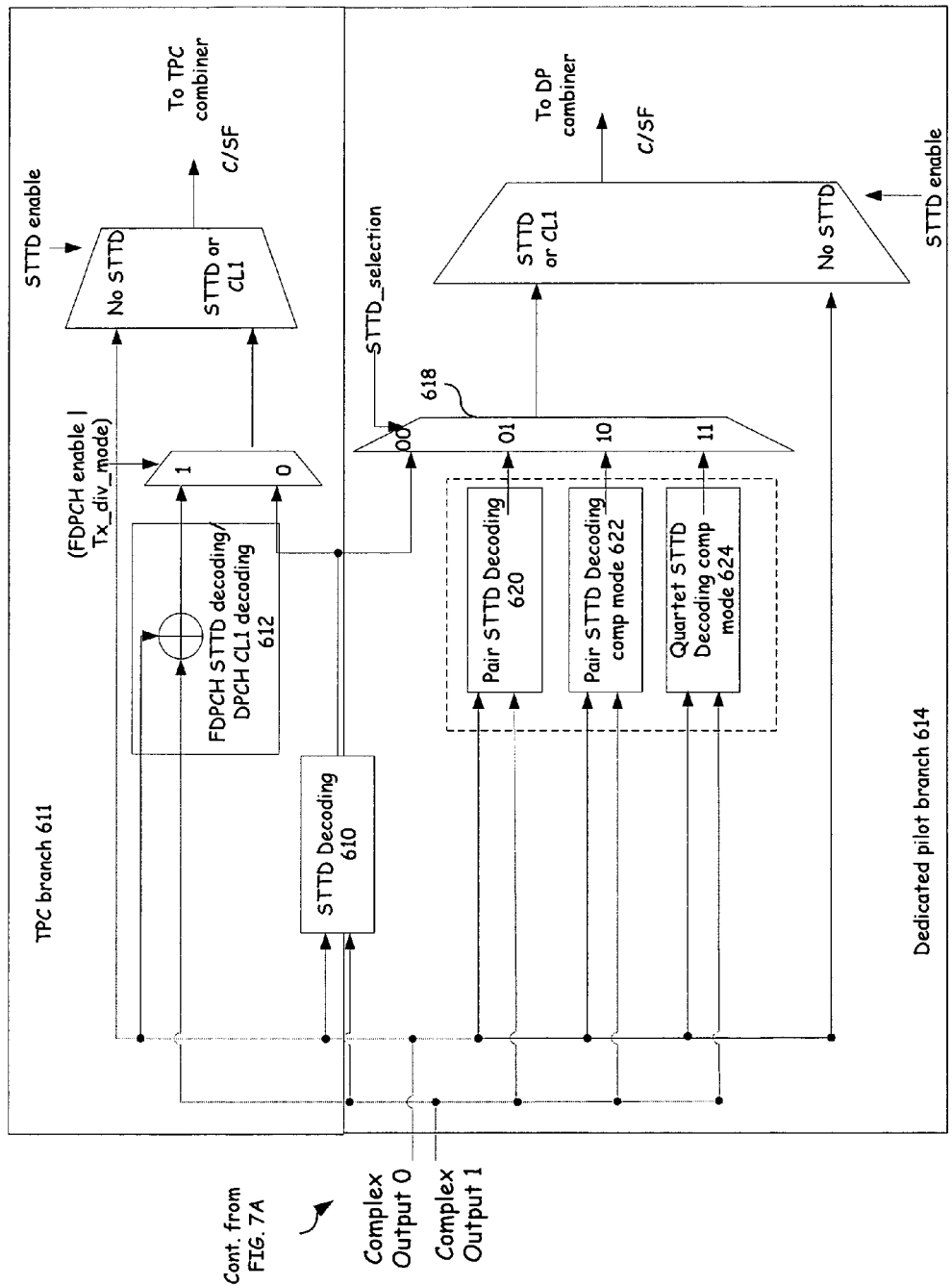

FIGS. 7A and 7B provide a block diagram of a finger DPCH processing block in accordance with an embodiment of the present invention following the structure shown in FIG. 4B, i.e., the finger processing block produces two outputs, a TPC output and a DP output, each directed towards its respective combiner block. Starting from the input of the DPCH processing from the left-most side, the finger processing block takes the chip-level descrambled input from the sampling circuit and despread the data based on the OVSF code. This processing is similar to that done by block 504 as discussed in FIG. 6. To complete this function the block needs the OVSF index and the OVSF code phase, which is aligned with the slot boundary. The OVSF index can be used to look-up the actual OVSF code. The output of the DPCH despreading block is SF-chip rate or "C/SF."

The despread DPCH pilot symbol is quantized and passed through the channel compensation module 602. The channel estimates are read in at the same SF-chip rate. The output of the channel compensation block is directed to 2 paths:

Normal/STTD mode path: Tx_div_mode=0, the signal is passed directly through Multiplexer 604 for further processing.

CL mode: Tx_div_mode=1, the signal is multiplied by the CL gains w0* and w1*, and then through multiplexer 604 for further processing.

The output of multiplexer 604 labeled complex output 0 and complex output 1 corresponding to Tx antennas 1 and 2 (Both output signals are active if either STTD or CL1 is ON; In normal mode, only complex output 0 is active) is then directed into two main branches, the TPC branch and DP branch. As continued in FIG. 7B In the TPC branch 611, the signal may be processed in 3 ways: Normal mode, STTD-mode-regular-DPCH, and STTD-mode-Fractional-DPCH-or-CL1-mode-regular-DPCH. In the normal mode, STTD enable=0.

In the STTD-mode-regular-DPCH: STTD enable=1 and FDPCH enable=0. The 2 input signals (corresponding to Tx antennas 1 and 2) are passed through the STTD decoding block 610. The output of the STTD decoding block 610 is a complex number.

In the STTD-mode-Fractional-DPCH-or-CL1-mode-regular-DPCH: STTD enable=1 and FDPCH enable=1, the 2 input signals (corresponding to Tx antennas 1 and 2) are passed through the FDPCH STTD decoding block 612, in which the 2 input signals are simply added to become a complex number. In all cases, the output is sent to DPCCH/F-DPCH TPC combiner, committed to the TPC processing.

In the DP branch 614, the 2 input signals may be processed in 5 ways. These are the Normal mode, STTD decode, Pair STTD decode, Pair STTD decode compressed mode, and Quartet STTD decode compressed mode. In the normal mode, STTD enable=0. This mode may be applied to all slot formats, and in this mode, the signal is passed directly to the DPCCH DP combiner.

The STTD or CL1 mode has 4 cases and is selected with multiplexer 618. The four inputs to multiplexer 618 include STTD decode block 610, Pair STTD decode block 620, Pair STTD decode compressed mode block 622, and Quartet STTD decode compressed mode block 624. A 2-bit unsigned register STTD_selection allows for the selection of one of these 4 cases depending on the slot format. This is indicated by Table 3.

TABLE 3

Value of register STTD_selection when STTD or CL1 is ON for all different slot formats

| Slot format | STTD_selection | STTD enable | comment | Slot formats (cf. Table 1) |
|---|---|---|---|---|
| Non compressed Npilot bits = 2, 4 | 00 | 1 | STTD decode | 2, 3, 4, 5, 8, 9, 2A, 3A, 4A, 5A, 8A, 9A |
| Non compressed Npilot bits = 8, 16 | 01 | 1 | Pair STTD decode | 6, 7, 10, 11, 12, 13, 14, 15, 16, 6A, 7A, 10A, 11A, 12A, 13A, 14A, 15A, 16A |
| Compressed Npilot bits = 4 | 00 | 1 | STTD decode | 2B, 3B |
| Compressed Npilot bits = 8 | 10 | 1 | Pair STTD decode compressed mode | 4B, 5B, 8B, 9B |
| Compressed Npilot bits = 16, 32 | 11 | 1 | Quartet STTD decode compressed mode | 6B, 7B, 10B, 11B, 12B, 13B, 14B, 15B |

The STTD decode mode is applied to slot formats: Non compressed Npilot bits=2, 4, and Compressed Npilot bits=4. In this case, the 2 input signals (corresponding to Tx antennas 1 and 2) are passed through the STTD decoding block 610. The output of the STTD decoding block 610 is a complex number.

The Pair STTD decode mode is applied to slot formats: Non compressed Npilot bits=8 and 16. In this case, the 2 input signals (corresponding to Tx antennas 1 and 2) are passed through the pair STTD decoding block 620. The output of the pair STTD decoding block is a complex number.

The Pair STTD decode compressed mode is applied to slot formats: Compressed mode, Npilot bits=8. In this case, the 2 input signals (corresponding to Tx antennas 1 and 2) are passed through the pair STTD decoding compressed mode block 622. The output of the pair STTD decoding compressed mode block is a complex number.

The Quartet STTD decode compressed mode is applied to slot formats: Compressed Npilot bits=16 and 32. In this case, the 2 input signals (corresponding to Tx antennas 1 and 2) are passed through the quartet STTD decoding compressed mode block 624. The output of the quartet STTD decoding compressed mode block is a complex number.

Figure 8:
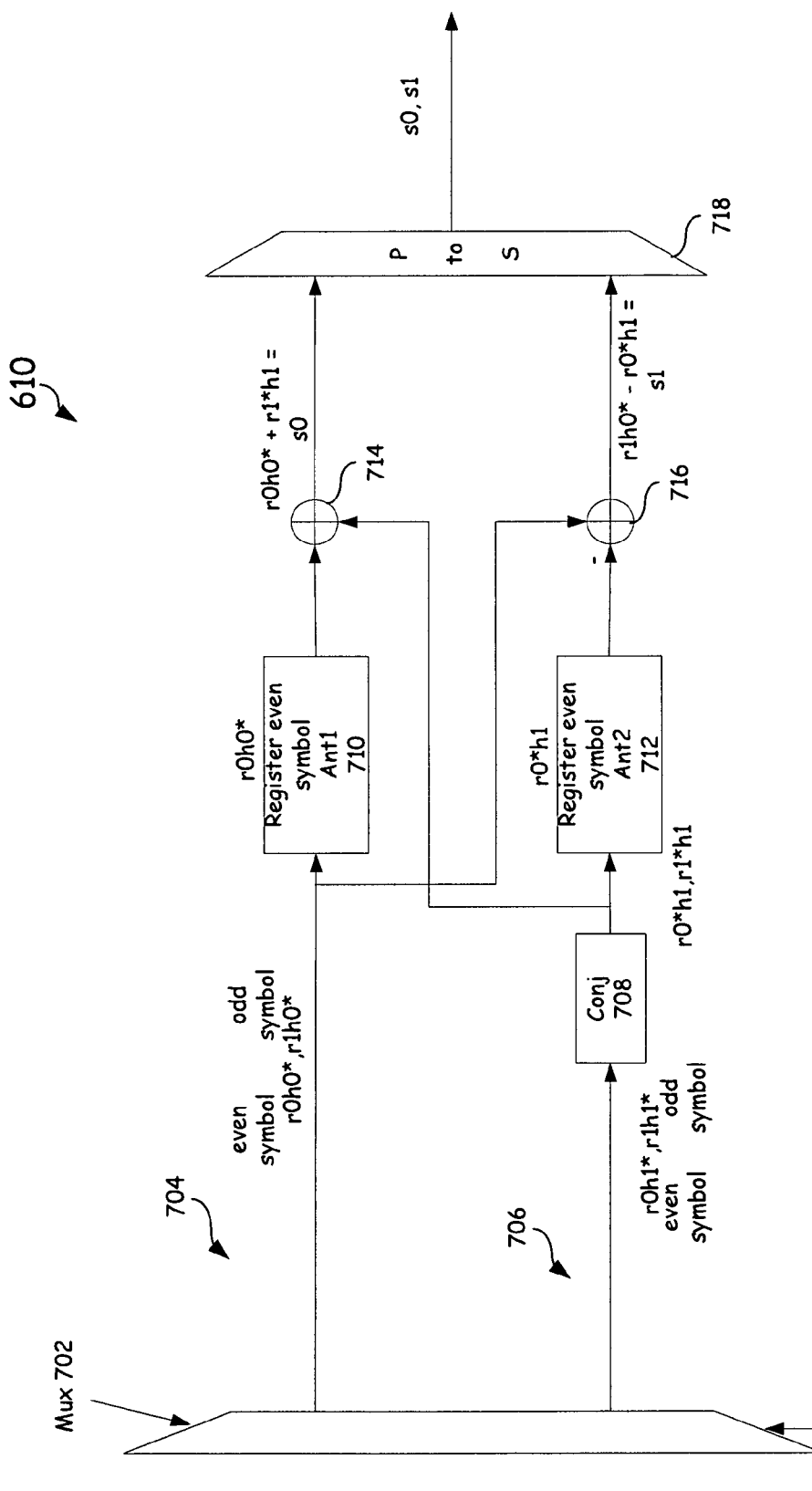
FIG. 8 is a detailed block diagram illustrating a Space Time Transmit Diversity (STTD) decoding block in accordance with one or more embodiments of the present invention.

FIG. 8 provides a detailed block diagram of the STTD decoding block 610 in accordance with embodiments of the present invention. Multiplexer 702 (which refers to multiplexer 604 of FIG. 7A) outputs two branches, branch 704 and branch 706. Block 708 conjugates all symbols incoming in branch 706. Blocks 710 and 712 register even symbols incoming in branch 704 and branch 706. The even symbols of branch 704 are summed with odd symbols of branch 706 in summing module 714. The even symbols of branch 706 are subtracted from odd symbols of branch 704 with summing module 716. The output of the decoding block is a complex number that is processed as described with respect to FIGS. 7A and 7B.

Figure 9:
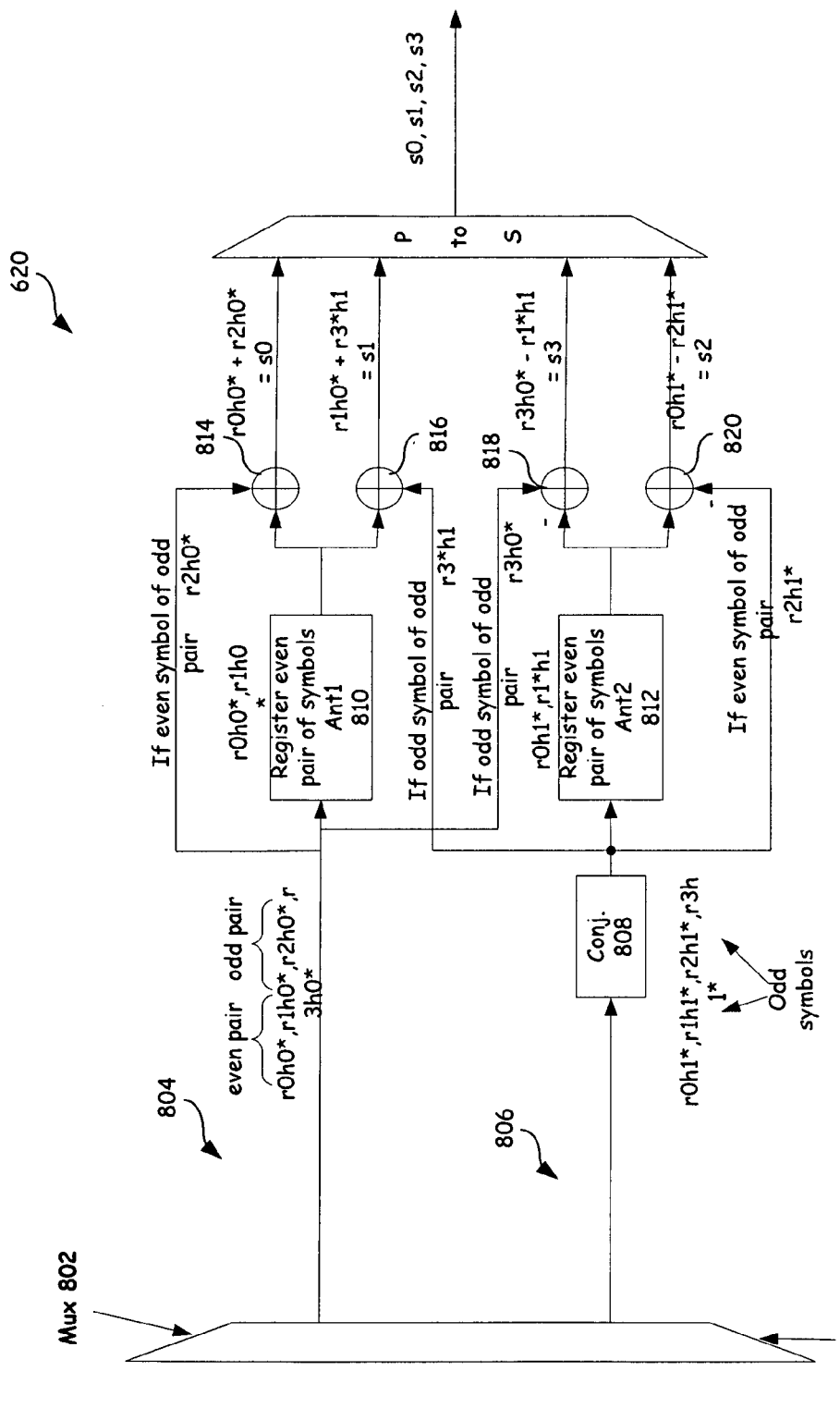
FIG. 9 is a detailed block diagram illustrating a pair of STTD decoding blocks in accordance with one or more embodiments of the present invention.

FIG. 9 provides a detailed block diagram of the pair STTD decoding block 620, respectively in accordance with embodiments of the present invention. Pair STTD decoding block 620 is structured in the same way as the STTD decoding block 610. Multiplexer 802 (which refers to multiplexer 604 of FIG. 7A) outputs two branches, branch 804 and branch 806. Pair STTD decoding block 620 performs several steps. First, Pair STTD decoding block 620 take the conjugate of odd symbols incoming in branch 806 with block 808. Next, even pair of symbols incoming in branch 804 and branch 806 is registered with blocks 810 and 812 respectively. Summing module 814 sums the even symbol of odd pairs with even symbol of even pair in branch 804. Summing module 816 sums odd symbol of odd pair of branch 806 with odd symbol of even pair of branch 804. Summing module 818 subtract odd symbols of even pair of branch 806 from odd symbol of odd pair of branch 804. Summing module 820 subtract even symbol of odd pair from even symbol of even pair in branch 806. The output of the decoding block is a complex number that is processed as described with respect to FIGS. 7A and 7B.

Figure 10:
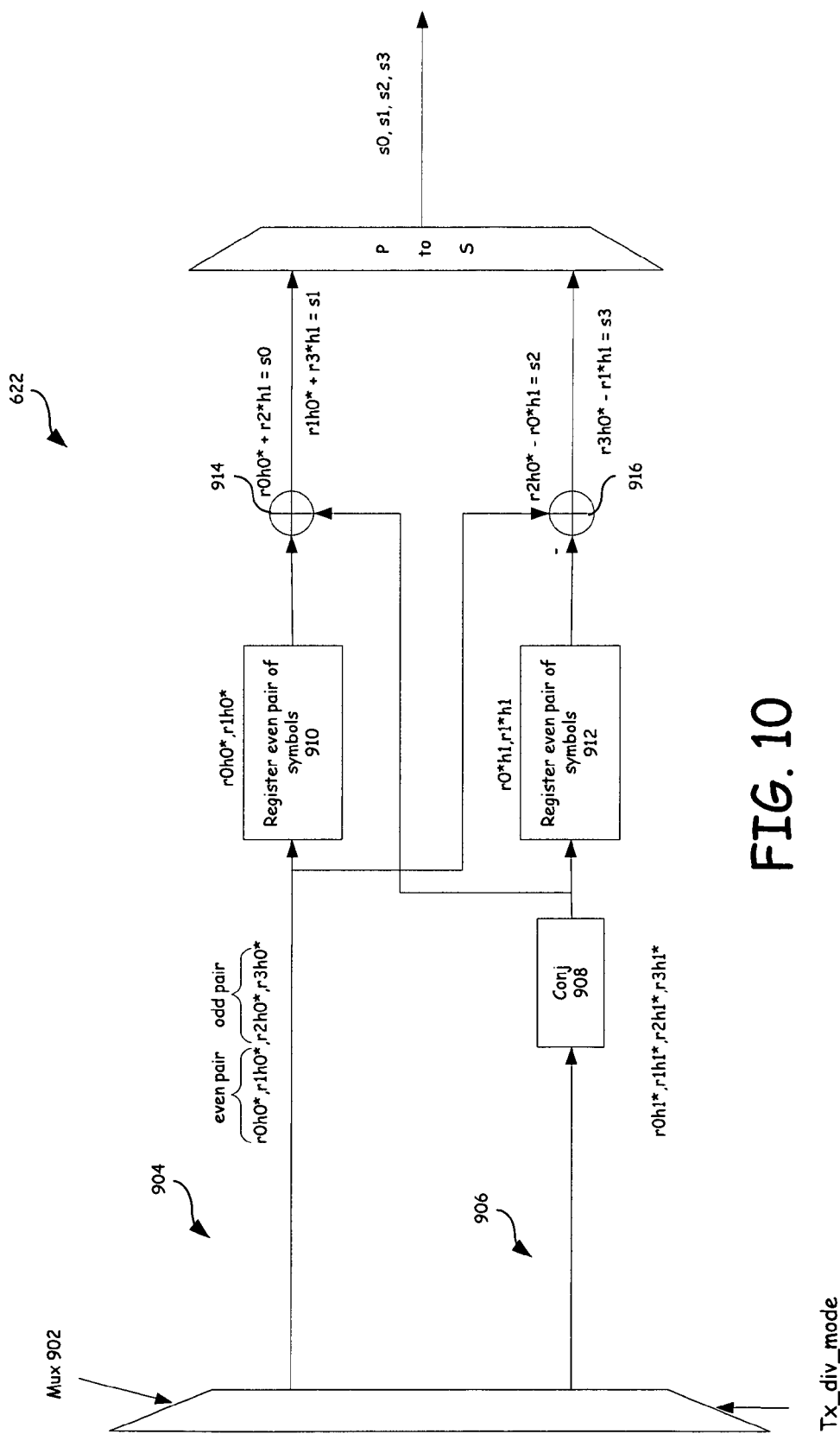
FIG. 10 is a detailed block diagram illustrating a pair of STTD decoding compressed mode blocks in accordance with one or more embodiments of the present invention.

FIG. 10 provides a detailed block diagram of the pair STTD decoding compressed mode block 622 in accordance with embodiments of the present invention. The pair STTD decoding compressed mode block is used in the case of compressed mode and 8 DP bits is structured in the same way as the STTD decoding block 610. Multiplexer 902 (which refers to multiplexer 604 of FIG. 7A) outputs two branches, branch 904 and branch 904. The pair STTD decoding compressed mode block performs several steps. First, block 908 take the conjugate of all symbols incoming in branch 906. Blocks 910 and 912 register even pair of symbols incoming in branch 904 and branch 906. Summing module 914 sums even symbol of odd pair of branch 906 with even symbol of even pair of branch 904. Summing module 914 sums odd symbols of odd pair of branch 906 with odd symbol of even pair of branch 904. Summing module 916 subtract even symbol of even pair of branch 906 from even symbol of odd pair of branch 904. Summing module 916 subtracts odd symbol of even pair of branch 906 from odd symbol of odd pair of branch 904. The output of the decoding block is a complex number that is processed as described with respect to FIGS. 7A and 7B.

Figure 11:
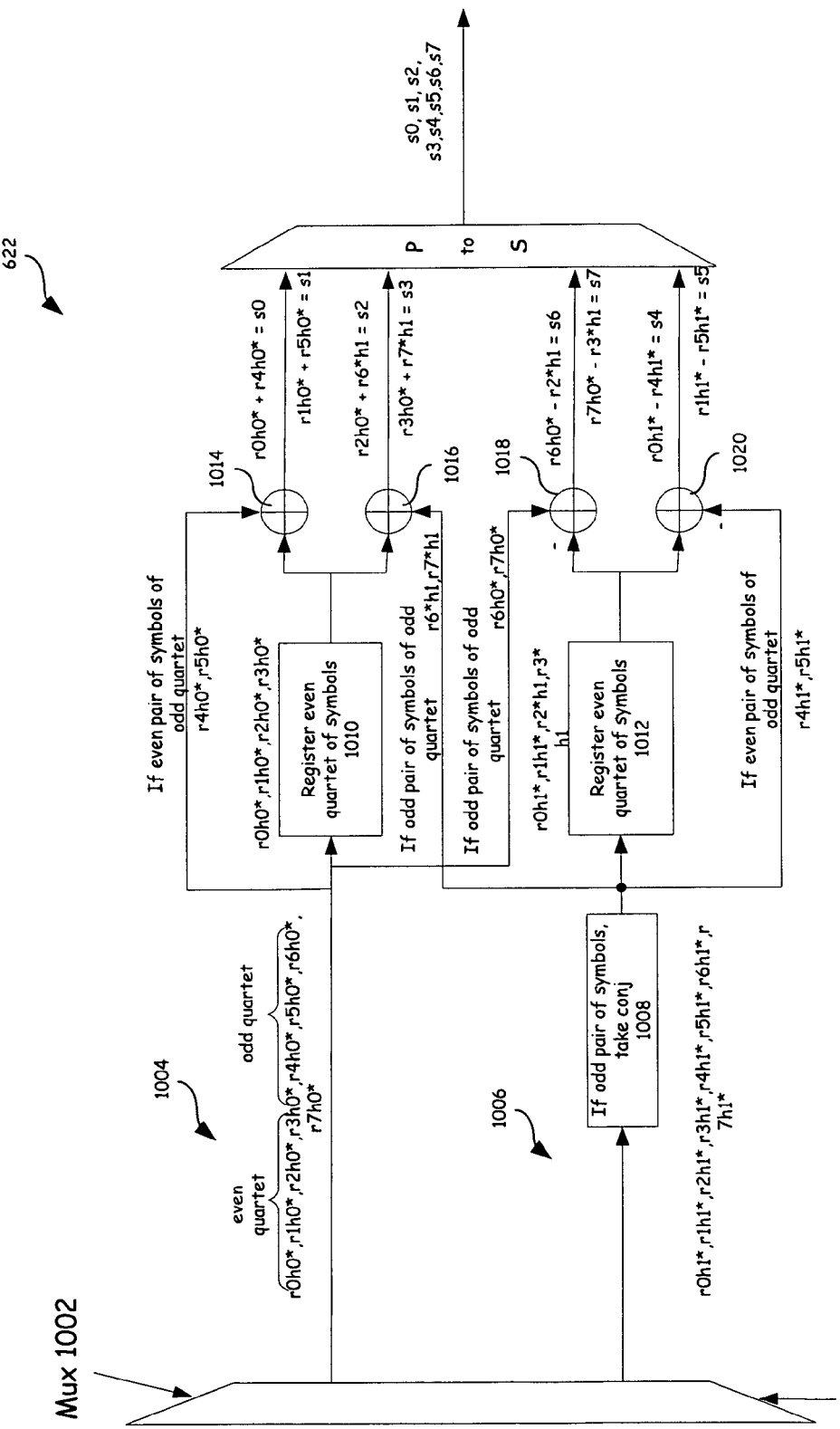
FIG. 11 is a detailed block diagram illustrating a quartet STTD decoding compressed mode block in accordance with one or more embodiments of the present invention.

FIG. 11 provides a detailed block diagram of the quartet STTD decoding compressed mode block 624, respectively in accordance with embodiments of the present invention. The quartet STTD decoding compressed mode block 924, used in the case of compressed mode with 16 and 32 DP bits, is structured in the same way as the STTD decoding block 610. Multiplexer 1002 (which refers to multiplexer 604 of FIG. 7A) outputs two branches, branch 1004 and branch 1006. There are several steps preformed by quartet STTD decoding compressed mode block 624. First, block 1008 takes the conjugate of the last 2 symbols of each quartet of symbols incoming in branch 1006. One way to recognize the last 2 symbols of each quartet is to use the slot-based symbol counter. Register even quartet of symbols incoming in branch 1004 and branch 1006 with blocks 1010 and 1012.

Summing modules 1014 and 1016 sum the first symbol of odd quartet with first symbol of even quartet in branch 1004, the second symbol of odd quartet with second symbol of even quartet in branch 1004, the third symbol of odd quartet of branch 1006 with third symbol of even quartet of branch 1004; the fourth symbol of odd quartet of branch 1006 with fourth symbol of even quartet of branch 1004.

Summing modules 1018 and 1020 subtract third symbol of even quartet of branch 1006 from third symbol of odd quartet of branch 1004, the fourth symbol of even quartet of branch 1006 from fourth symbol of odd quartet of branch 1004, the first symbol of odd quartet from first symbol of even quartet in branch 1006, and subtract second symbol of odd quartet from second symbol of even quartet in branch 1006. The output of the decoding block is a complex number that is processed as described with respect to FIG. 7.

Figure 12:
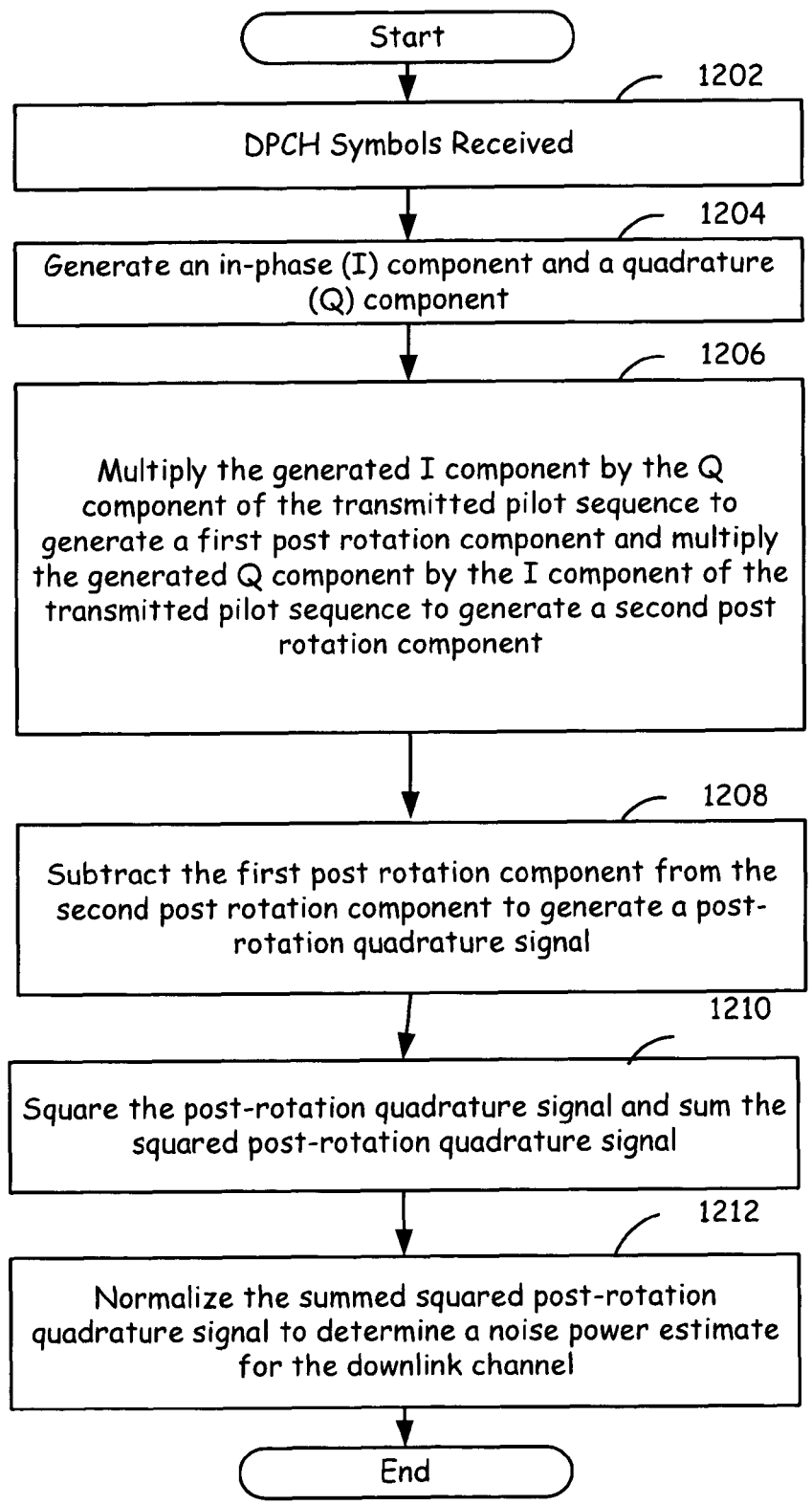
FIG. 12 is a logic flow diagram illustrating embodiments of the present invention that process Dedicated Pilot (DP) bits to produce a noise power estimate in a WCDMA network.

FIG. 12 provides a logic flow diagram in accordance with embodiments of the present invention that describes a method to process DP bits to produce a noise power estimate in a WCDMA network. Operations 1200 begin in Step 1202, where DPCH pilot symbols are received. In Step 1204 an in-phase (I) component and a quadrature (Q) component are generated based on the received DPCH pilot symbols. The generated I component is multiplied in step 1206 by the Q component of the transmitted pilot sequence to generate a first post rotation component, and the generated Q component is multiplied by the I component of the transmitted pilot sequence to generate a second post rotation component. In step 1208, the first post rotation component is subtracted from the second post rotation component to generate a post-rotation quadrature signal. The post-rotation quadrature signal is squared in step 1210 and summed over the number of DPCH pilot symbols per slot of the downlink channel. In step 1212, the summed squared post-rotation quadrature signal is normalized by the number of DPCH pilot symbols per slot of the downlink channel to produce a noise power estimate for the downlink channel.

As illustrated in FIG. 4, the DPCH combiner handles TPC and DP bits separately. In the design of FIG. 4B, each finger processing block has 2 outputs, one for TPC and one for DP. The TPC output is wired to the DPCCH/F-DPCH TPC combiner module and the DP output is wired to the DPCCH DP combiner module for their respective processing. A new noise estimation method in the DP processing block of the DPCCH DP combiner module is described. This noise power method is shown to produce a more accurate estimate under the scenario of multiple fingers in various normal/Tx diversity mode combinations. To highlight the change needed, FIG. 13 shows a first combiner block for DP processing and FIG. 14 shows a second combiner block for DP processing.

Figure 13:
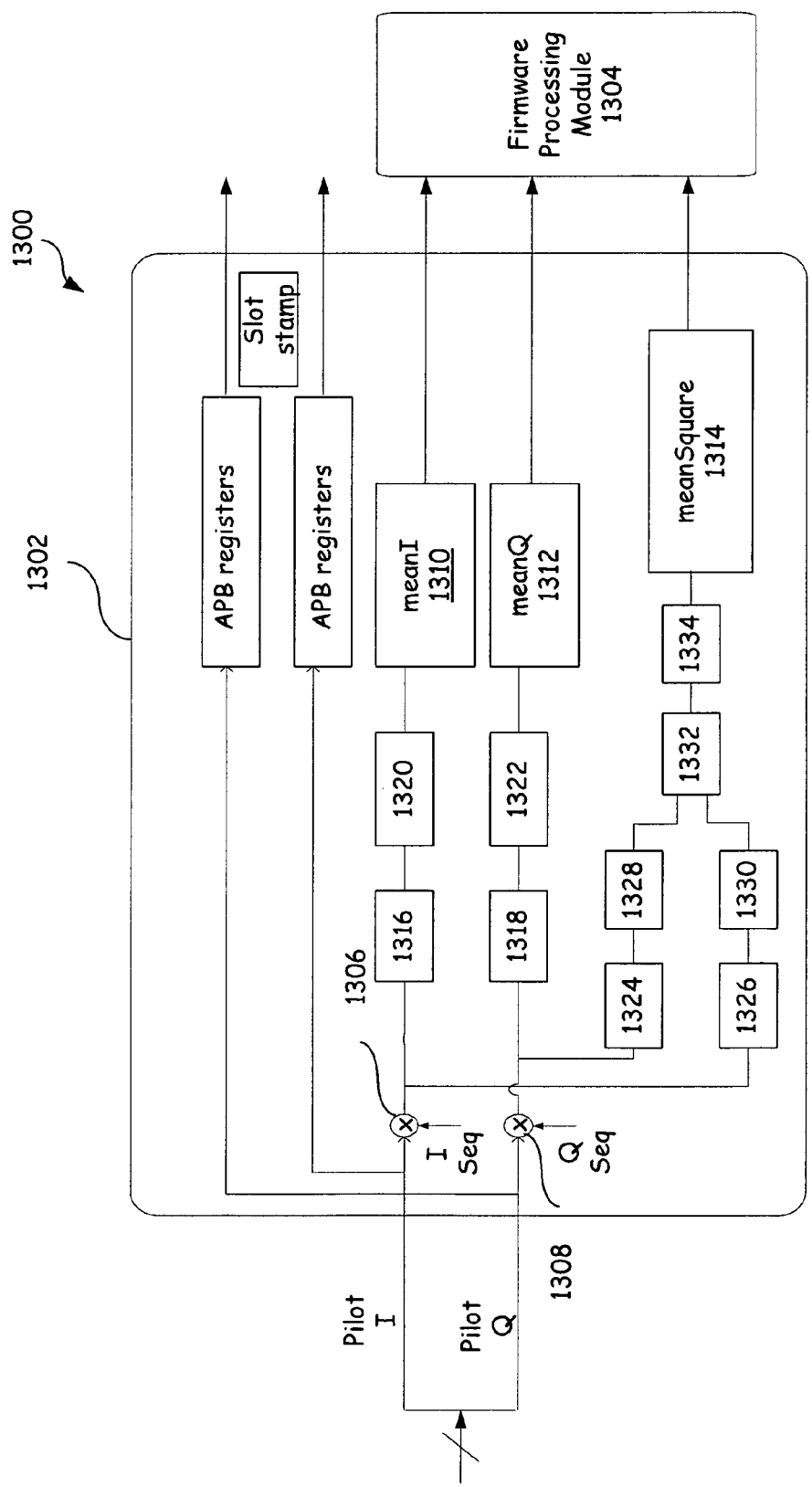
FIG. 13 is a block diagram illustrating the determination of a noise power estimate in a WCDMA network, which may be used in accordance with one or more embodiments of the invention.

FIG. 13 provides one embodiment of DP bits processing in DP SNR estimator with HW/FW partition. DP bit processing is divided between HW portion 1302 and FW portion 1304. The input to the combiner DP processing block 1300 is the DP I and Q post DP extraction after all fingers have been summed. They are denoted by PilotI and PilotQ. Three variables are being computed for the purpose of SNR estimation: meanI 1310, meanQ 1312, and meanSquare 1314. PilotI and PilotQ are multiplied by the pilot sequence (sent from Tx antenna 1) at multipliers 1306 and 1308 respectively. This operation consists of a sign change. Then an accumulation is performed over the number of DP symbols with accumulators 1316 and 1318. Then the accumulation in normalized by the number of DP symbols in processing modules 1320 and 1322 and outputs MeanI 1310 and MeanQ 1312.

In the lower branch, PilotI and PilotQ are multiplied by the pilot sequence (sent from Tx antenna 1) at multipliers 1306 and 1308 respectively. This operation consists of a sign change. Then each signal is squared using processing modules 1324 and 1326 resulting in an unsigned value. Then an accumulation is performed over the number of DP symbols with accumulators 1328 and 1330, resulting in an unsigned output. The I and Q branch are then summed at summer 1332 resulting in an unsigned output. Then the accumulation in normalized by the number of DP bits 2n with processing module 1334 and outputs an unsigned number, denoted as meanSquare 1314. The variables meanI 1310, meanQ 1312 and meanSquare 1314 are passed to FW portion 1304 of FIG. 15 which proceeds with the SNR computation.

Figure 14:
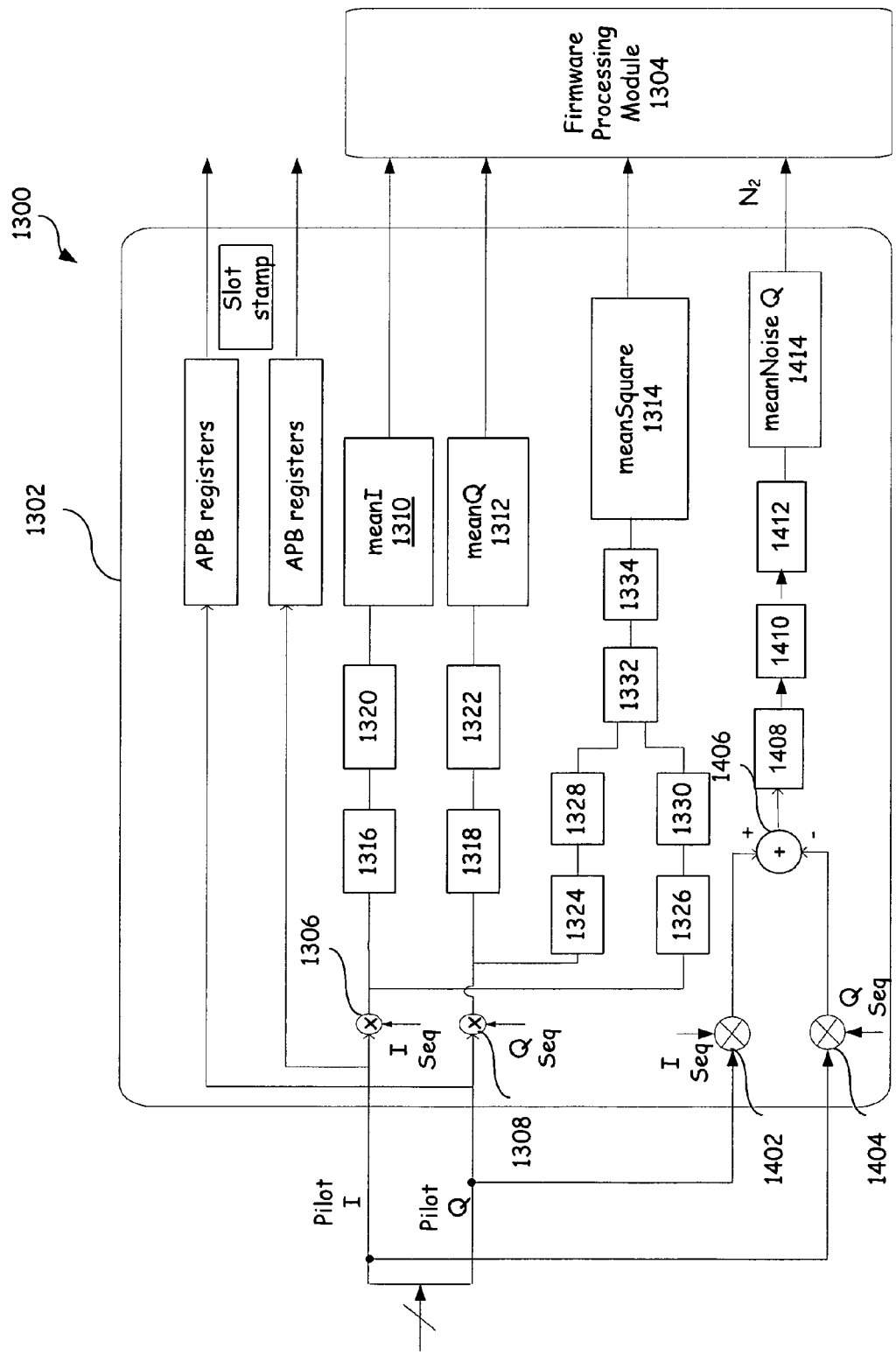
FIG. 14 is a block diagram illustrating determination of a noise power estimate in a WCDMA network utilizing the transmitted pilot sequence to produce a post-rotation quadrature signal, which may be used in accordance with one or more embodiments of the invention.

As shown in FIG. 14, embodiments of the present invention may add one new branch for the noise power estimation, of very similar structure as the paths that compute meanI, meanQ and meanSquare.

PilotI and PilotQ are multiplied by the pilot sequence (sent from Tx antenna 1) at multipliers 1402 and 1404 respectively such that:

$$yI = PilotQ * ISeq$$

$$yQ = PilotI * QSeq$$

where yI and yQ are signed values. yI is then subtracted from yQ at summation module 1406 to obtain a signed value denoted as y and referred to as the post-rotation quadrature signal.

$$y = yQ - yI$$

then the square of y is taken at processing module 1408 yielding an unsigned value denoted as y_sq and referred to as the squared post-rotation quadrature signal:

$$y\_sq = y * y$$

y_sq is accumulated over the number of DP symbols, at processing module 1410 resulting in an unsigned output referred to as the summed squared post-rotation quadrature signal. Then the accumulation is normalized at processing module 1412 by the number of DP symbols and outputs an unsigned number, denoted as meanNoiseQ corresponding to the noise power estimate of the downlink channel. This value is passed on to the FW processing module 1304 which may use it as an alternative noise value to the one currently computed as discussed with reference to FIG. 13.

Figure 15:
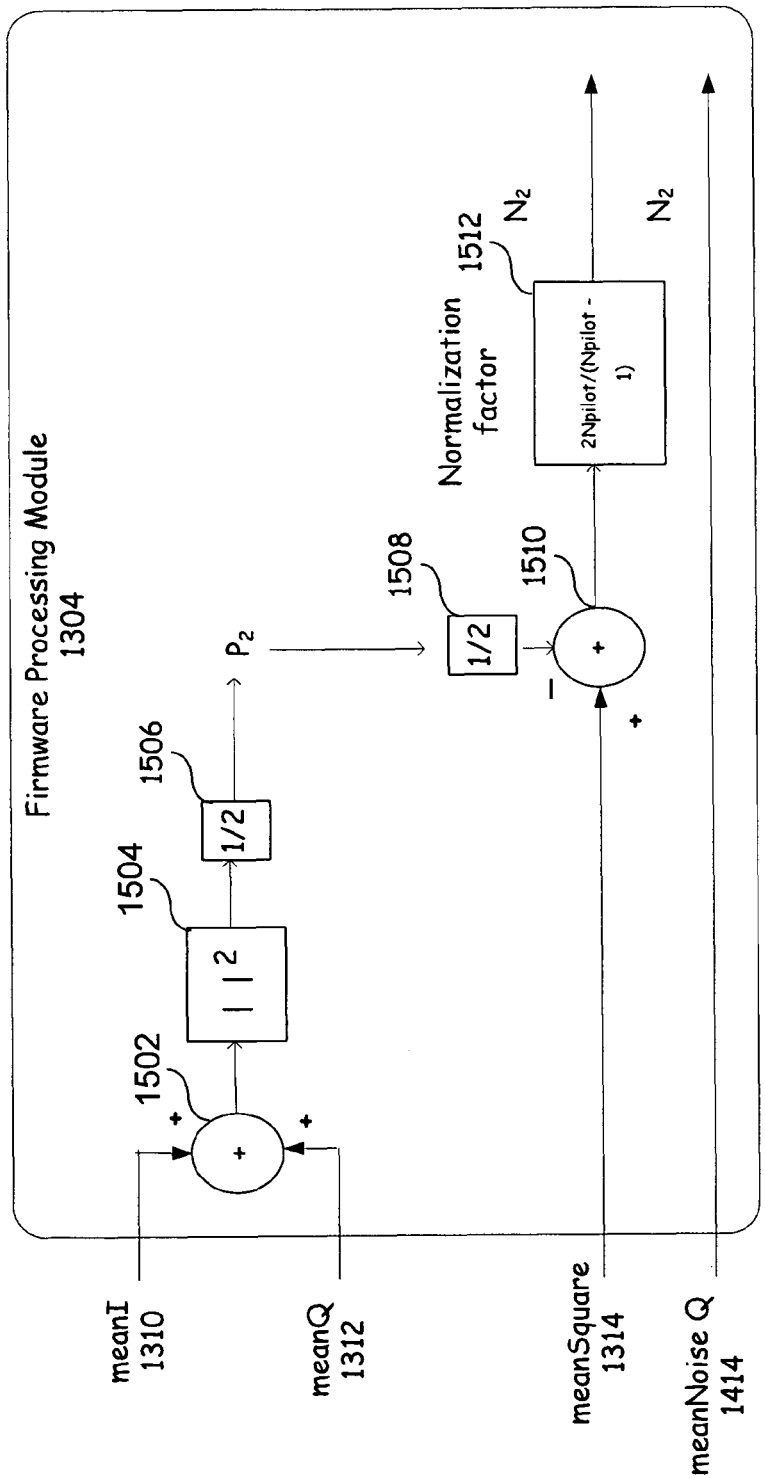
FIG. 15 is a functional block diagram illustrating a FW processing module in accordance with one or more embodiments of the present invention.

FIG. 15 provides a function block diagram of FW processing module 1304 in accordance with embodiments of the present invention. FW processing module 1304 includes summation module 1502, processing module 1504, divides by 2 processing module 1506, divide by 2 processing module 1508, summation module 1510 and normalization factor processing module 1512. In one embodiment FW portion 1304 takes MeanI 1310 and meanQ 1312, sums them at summation module 1502, takes the square at processing module 1504 and divides by 2 at processing module 1506 to obtain P2.

$$mean_I + mean_Q = \frac{1}{Npilot/4}\sqrt{\frac{S}{2}\sum_i |h_i|^2} + \frac{1}{Npilot/2}\left(\sum_i \mathrm{Re}(n_i h_i^*) + \sum_i \mathrm{Im}(n_i h_i^*)\right)$$

$$(mean_I + mean_Q)^2 = \frac{1}{Npilot^2/8}S\left(\sum_i |h_i|^2\right)^2 + \frac{1}{Npilot^2/4}\left(\sigma^2 \sum_i |h_i|^2\right)$$

Hence, $$\hat{S}_{DPCH} = P_2$$
$$= \frac{1}{2}(mean_I + mean_Q)^2$$
$$= \frac{1}{Npilot^2/4}S\left(\sum_i |h_i|^2\right)^2 + \frac{1}{Npilot^2/2}\left(\sigma^2 \sum_i |h_i|^2\right)$$

One embodiment of the FW portion 1304 further takes meanSquare 1314 and subtract P2/2 from it in summation block 1510, then multiplies the output of 1510 by a scaling factor in block 1512 to obtain N2.

$$meanSquare - \frac{P_2}{2} = \frac{S}{2}|h|^4 + \frac{\sigma^2}{2}|h|^2 - \frac{S}{2}|h|^4 - \frac{\sigma^2|h|^2}{2Npilot}$$

$$= \frac{\sigma^2|h|^2}{2} - \frac{\sigma^2|h|^2}{2Npilot}$$

$$= \sigma^2|h|^2 \left(\frac{Npilot-1}{2Npilot}\right)$$

$$\hat{N}_{DPCH} = N_2 = \left(meanSquare - \frac{P_2}{2}\right) \cdot \left(\frac{2Npilot}{Npilot-1}\right)$$

This method of computing N2 relies on the assumption that the channel is constant across the pilot field. A more general method to compute the noise power estimate is to directly use the estimate meanNoiseQ 1414 as N2.

$$meanNoiseQ = \frac{1}{Npilot/2} \sum_{i=0}^{Npilot/2-1} (\text{Im}(r_i \cdot s_i^*))^2$$

$$= \frac{1}{Npilot/2} \sum_{i=0}^{Npilot/2-1} (\text{Im}(n_i h_i^* \cdot s_i^*))^2$$

$$\hat{N}_{DPCH} = N_2 = meanNoiseQ = \frac{\sigma^2}{Npilot/2} \sum_{i=0}^{Npilot/2-1} |h_i|^2$$

The ratio of $\hat{S}_{DPCH}$ to $\hat{N}_{DPCH}$ gives the SNR estimate as $$\frac{\hat{S}_{DCPH}}{\hat{N}_{DPCH}} = \frac{\frac{1}{Npilot^2/4} S\left(\sum_i |h_i|^2\right)^2 + \frac{\sigma^2}{Npilot^2/2}\left(\sum_i |h_i|^2\right)}{\frac{\sigma^2}{Npilot/2} \sum_{i=0}^{Npilot/2-1} |h_i|^2}$$

$$= \frac{S \sum_i |h_i|^2}{Npilot/2 \cdot \sigma^2} + \frac{1}{Npilot}$$

Where 1/Npilot is the remaining bias.

In summary, embodiments of the present invention provide a method to process DP bits from multiple fingers within a WCDMA rake receiver where noise estimation may be implemented within hardware provides for improved flexibility and performance. DPCH pilot symbols are received, quantized and channel compensated. Then processing operations for individual fingers for the channel compensated quantized despread DPCH pilot symbols are chosen based on the DPCH slot format. The DPCH pilot symbols are processed based on the DPCH slot format in order to produce processed DPCH pilot symbols in a common format. These processed symbols may then be combined. The computation of an SNR estimate based on the combined DPCH pilot symbols is provided. Noise estimation is used as part of the SNR estimation of the DP bits (used for downlink power control). This method does not rely on the assumption that the channel is constant over the DP field, while prior methods did.

As one of average skill in the art will appreciate, the noise estimation method of the present invention described above and presented in the context of a Rake receiver may also be applied to a receiver equipped with a chip equalizer. As such, the DPCH pilot symbols are received, quantized and combined within a chip equalizer across taps. The combined signal may then be despread into DPCH pilot symbols. The computation of the SNR estimate, including the noise estimation method from the present invention, may then be applied to the combined DPCH pilot symbols.

As one of average skill in the art will appreciate, the term "substantially" or "approximately", as may be used herein, provides an industry-accepted tolerance to its corresponding term. Such an industry-accepted tolerance ranges from less than one percent to twenty percent and corresponds to, but is not limited to, component values, integrated circuit process variations, temperature variations, rise and fall times, and/or thermal noise. As one of average skill in the art will further appreciate, the term "operably coupled", as may be used herein, includes direct coupling and indirect coupling via another component, element, circuit, or module where, for indirect coupling, the intervening component, element, circuit, or module does not modify the information of a signal but may adjust its current level, voltage level, and/or power level. As one of average skill in the art will also appreciate, inferred coupling (i.e., where one element is coupled to another element by inference) includes direct and indirect coupling between two elements in the same manner as "operably coupled". As one of average skill in the art will further appreciate, the term "compares favorably", as may be used herein, indicates that a comparison between two or more elements, items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

The foregoing description of a preferred embodiment of the invention has been presented for purposes of illustration and description. It is not intended to be exhaustive or to limit the invention to the precise form disclosed, and modifications and variations are possible in light of the above teachings or may be acquired from practice of the invention. The embodiment was chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. A method for signal processing performed by a wireless receiver, the method comprising:
   receiving, combining and despreading Dedicated Physical Channel (DPCH) pilot symbols from a wireless signal;
   generating a post-rotation quadrature component signal based on the despread DPCH pilot symbols and on a pilot sequence transmitted by a transmitter;
   computing the power of said post-rotation quadrature signal to produce a noise power estimate;
   extracting the Dedicated Physical Channel (DPCH) pilot symbols from said received signal and generating an in-phase (I) component and a quadrature (Q) component;
   multiplying said generated I component by Q component of said transmitted pilot sequence to generate a first post rotation component; and
   multiplying said generated Q component by I component of said transmitted pilot sequence to generate a second post rotation component.

2. The method of claim 1 wherein the step of combining may occur prior or posterior to the step of despreading and may comprise either equalizer combining across taps or Rake combining across fingers.

3. The method according to claim 1 further comprising:
subtracting said first post rotation component from said second post rotation component to generate said post-rotation quadrature signal.

4. The method according to claim 3, further comprising:
squaring said post-rotation quadrature signal;
summing squared post-rotation quadrature signal over the number of said (DPCH) pilot symbols per slot of said downlink channel; and
normalizing summed squared post-rotation quadrature signal to produce said noise power estimate.

5. The method according to claim 4 wherein said normalizing comprises dividing said summed squared post-rotation quadrature signal by the number of said (DPCH) pilot symbols per slot of said downlink channel.

6. A method for operating a wireless receiver to produce a noise power estimate from a received wireless signal received by the wireless receiver that has a Rake containing multiple fingers, said wireless signal is transmitted by a transmitter, the method comprising
receiving Dedicated Physical Channel (DPCH) pilot symbols; and
processing the DPCH pilot symbols to produce a noise power estimate based on the DPCH pilot symbols and on a pilot sequence transmitted by the transmitter;
wherein a processing mode is selected for individual fingers of the Rake for the DPCH pilot symbols based on a DPCH slot format associated with the DPCH pilot symbols and on the transmit diversity mode used at said transmitter.

7. The method of claim 6, wherein the processing mode is selected from a set of processing modes comprising:
Normal mode;
STTD decoding mode;
pair STTD decoding mode;
pair STTD decoding compressed mode; and
quartet STTD decoding compressed mode.

8. The method of claim 7, wherein said selected mode is selected per-finger and thereby may differ across multiple fingers.

9. The method of claim 6, wherein producing the noise power estimate includes:
generating a post-rotation quadrature component signal based on the DPCH pilot symbols and on said pilot sequence transmitted by said transmitter; and
computing the power of said post-rotation quadrature signal to produce said noise power estimate.

10. The method of claim 9, further comprising:
extracting the Dedicated Physical Channel (DPCH) pilot symbols from said received signal; and
generating an in-phase (I) component and a quadrature (Q) component.

11. The method according to claim 10, further comprising:
multiplying said generated I component by a Q component of said transmitted pilot sequence to generate a first post rotation component; and
multiplying said generated Q component by an I component of said transmitted pilot sequence to generate a second post rotation component.

12. The method according to claim 11 further comprising:
subtracting said first post rotation component from said second post rotation component to generate said post-rotation quadrature signal.

13. The method according to claim 12, further comprising:
squaring said post-rotation quadrature signal;
summing squared post-rotation quadrature signal over the number of said (DPCH) pilot symbols per slot of said downlink channel; and
normalizing summed squared post-rotation quadrature signal to produce said noise power estimate.

14. The method according to claim 13 wherein said normalizing comprises dividing said summed squared post-rotation quadrature signal by the number of said (DPCH) pilot symbols per slot of said downlink channel.

15. A WCDMA receiver comprising:
a radio frequency (RF) front end operable to convert a received RF signal to a baseband signal, said RF signal is received from a transmitter;
a baseband receiver block coupled to the RF front end operable to receive the baseband signal; and
a DPCCH/F-DPCH Processing block have a rake structure, the DPCCH/F-DPCH Processing block operable to produce a noise power estimate using partitioned hardware and firmware processing modules, wherein DPCH pilot symbols are processed to produce the noise power estimate based on the DPCH pilot symbols and on a pilot sequence transmitted by said transmitter;
wherein an SNR estimate is based on noise power estimation computed by:
multiplying said generated I component by Q component of said transmitted pilot sequence to generate a first post rotation component; and
multiplying said generated Q component by I component of said transmitted pilot sequence to generate a second post rotation component;
subtracting said first post rotation component from said second post rotation component to generate said post-rotation quadrature signal;
squaring said post-rotation quadrature signal;
summing squared post-rotation quadrature signal over the number of said (DPCH) pilot symbols per slot of said downlink channel; and
normalizing summed squared post-rotation quadrature signal to produce said noise power estimate.

16. The WCDMA receiver of claim 15, wherein the partitioned hardware and firmware processing modules produce the noise power estimate based on an in-phase (I) component and a quadrature (Q) component.

* * * * *